(12) United States Patent
Hu et al.

(10) Patent No.: US 10,813,070 B2
(45) Date of Patent: Oct. 20, 2020

(54) METHOD AND APPARATUS FOR DETERMINING CLOCK TIME DEVIATION BETWEEN TERMINAL AND BASE STATION

(71) Applicant: HUAWEI TECHNOLOGIES CO., LTD., Shenzhen, Guangdong (CN)

(72) Inventors: Hengjie Hu, Beijing (CN); Jun Zhang, Shenzhen (CN); Junping Sun, Beijing (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 0 days.

(21) Appl. No.: 16/446,291

(22) Filed: Jun. 19, 2019

(65) Prior Publication Data

US 2019/0306821 A1 Oct. 3, 2019

Related U.S. Application Data

(63) Continuation of application No. PCT/CN2017/106109, filed on Oct. 13, 2017.

(30) Foreign Application Priority Data

Dec. 20, 2016 (CN) .......................... 2016 1 1186260

(51) Int. Cl.
*H04W 56/00* (2009.01)

(52) U.S. Cl.
CPC ....... *H04W 56/0045* (2013.01); *H04W 56/00* (2013.01); *H04W 56/0035* (2013.01); *H04W 56/0065* (2013.01)

(58) Field of Classification Search
None
See application file for complete search history.

(56) References Cited

U.S. PATENT DOCUMENTS

| 2002/0181438 A1 | 12/2002 | McGibney |
| 2007/0149206 A1 | 6/2007 | Wang et al. |

(Continued)

FOREIGN PATENT DOCUMENTS

| CN | 101594705 A | 12/2009 |
| CN | 101729127 A | 6/2010 |

(Continued)

OTHER PUBLICATIONS

Geoffrey M. Garner,"IEEE 1588 Version 2",ISPCS Ann Arbor; 08, Sep. 24, 2008, pp. 1-89.

(Continued)

*Primary Examiner* — Anh Vu H Ly
(74) *Attorney, Agent, or Firm* — Womble Bond Dickinson (US) LLP

(57) ABSTRACT

In a time deviation determining method, a terminal determines an uplink timing advance between the terminal and a base station; determines a one-way transmission delay based on the uplink timing advance; and determines a clock time deviation between the terminal and the base station based on the one-way transmission delay, a time difference between a base-station clock time of a system frame in two system frames and a terminal clock time of a following system frame in the two system frames, and a time difference between the two system frames. In the solution provided in this application, the clock deviation between the terminal and the base station can be determined more flexibly and accurately. In addition, signaling interaction between the terminal and the base station is reduced, and network resources are saved.

20 Claims, 13 Drawing Sheets

(56) References Cited

U.S. PATENT DOCUMENTS

| | | |
|---|---|---|
| 2010/0260155 A1 | 10/2010 | Grilli et al. |
| 2011/0222475 A1* | 9/2011 | Hole .................. H04W 72/087 370/328 |
| 2013/0336237 A1 | 12/2013 | Lin et al. |
| 2015/0009984 A1 | 1/2015 | Jung et al. |
| 2017/0142620 A1* | 5/2017 | Rune .................. H04W 72/042 |
| 2018/0102807 A1* | 4/2018 | Chen .................. H04L 25/03821 |
| 2019/0313450 A1* | 10/2019 | Mukherjee ........ H04W 72/0453 |

FOREIGN PATENT DOCUMENTS

| | | |
|---|---|---|
| CN | 101790188 A | 7/2010 |
| CN | 101977104 A | 2/2011 |
| CN | 102056284 A | 5/2011 |
| CN | 102164403 A | 8/2011 |
| CN | 102457371 A | 5/2012 |
| CN | 102769908 A | 11/2012 |
| CN | 104218677 A | 12/2014 |
| CN | 102761951 B | 1/2015 |
| CN | 103200665 B | 3/2016 |
| CN | 106488550 A | 3/2017 |
| EP | 2555567 A1 | 2/2013 |
| EP | 2391159 B1 | 6/2019 |

OTHER PUBLICATIONS

3GPP TS 36.104 V14.1.0 (Sep. 2016), 3rd Generation Partnership Project;Technical Specification Group Radio Access Network;Evolved Universal Terrestrial Radio Access (E-UTRA);Base Station (BS) radio transmission and reception (Release 14), Sep. 2016. total 211 pages.

3GPP TS 36.133 V14.1.0 (Sep. 2016),3rd Generation Partnership Project;Technical Specification Group Radio Access Network;Evolved Universal Terrestrial Radio Access (E-UTRA);Requirements for support of radio resource Management(Release 14),total 2226 pages.

Ericsson et al: "LTE Positioning Measurements", 3GPP TSG RAN WG1 Meeting #58; R1-093606, Shenzhen, China, Aug. 24-28, 2009, XP050388175. total 4 pages.

* cited by examiner

METHOD AND APPARATUS FOR DETERMINING CLOCK TIME DEVIATION BETWEEN TERMINAL AND BASE STATION

CROSS-REFERENCE TO RELATED APPLICATIONS

This application is a continuation of International Application No. PCT/CN2017/106109, filed on Oct. 13, 2017, which claims priority to Chinese Patent Application No. 201611186260.8, filed on Dec. 20, 2016. The disclosures of the aforementioned applications are hereby incorporated by reference in their entireties.

TECHNICAL FIELD

This application relates to the field of wireless communications, and in particular, to a clock time synchronization technology in a wireless communications system.

BACKGROUND

In a wireless network system, a clock of a terminal device needs to be calibrated to ensure accuracy of the clock of the terminal device. A base station can obtain a more accurate time because the base station can be synchronized with a clock source based on a wired network by accessing a GPS clock source or through assistance of IEEE 1588 hardware. Therefore, when the terminal device performs clock calibration, a commonly used method is to perform time synchronization with the base station and determine a time deviation between a terminal and the base station, so as to correct a clock error of the terminal device.

In the prior art, the time deviation between the terminal device and the base station is determined by exchanging a time synchronization packet. To overcome a time delay in packet transmission between the base station and the terminal device, a plurality of packet exchanges are performed, for example, in the NTP/SNTP or IEEE 1588 protocol, to determine the time deviation. IEEE 1588 protocol-based time synchronization is used as an example. As shown in FIG. 1, a master clock (base station) sends a synchronization packet Sync, and records a timestamp T1 of a sending moment. After receiving the synchronization packet Sync, a slave clock (terminal device) records a timestamp T2 of a receiving moment. Then, the master clock sends a follow-up packet Follow Up to bring the timestamp T1 to the slave clock. Then, the slave clock sends a delay request packet Delay Req, and records a timestamp T3 of a sending moment. After receiving the packet, the master clock records a timestamp T4 of a receiving moment. Then, the master clock sends a delay response packet Delay Resp to bring the timestamp T4 to the slave clock. Assuming that d1 is a one-way delay in transmitting the synchronization packet Sync from the master clock to the slave clock, d2 is a one-way delay in transmitting the delay request packet from the slave clock to the master clock, and an offset is a time difference between the slave clock and the master clock, T2=T1+d1+offset, and T4=T3+d2−offset. In an IEEE 1588 protocol-based time synchronization mechanism, it is assumed that the one-way delay in transmitting the synchronization packet Sync from the master clock to the slave clock is the same as the one-way delay in transmitting the delay request packet from the slave clock to the master clock, that is, $d101=d102$. Therefore, the slave clock can obtain a time deviation based on the four recorded timestamps: offset=((T2−T1)+(T3−T4))/2. In this way, the time deviation is determined and clock synchronization can be performed for the terminal device based on the time deviation.

The synchronization packet is usually transmitted through a wireless network. However, in the wireless network, an uplink transmission speed and a downlink transmission speed are usually not exactly the same. In addition, retransmission may be caused due to some factors during transmission. Consequently, a delay in unilateral transmission is increased. This results in a deviation between a one-way delay in transmission from the base station to the terminal device and a one-way delay in transmission from the terminal device to the base station, that is, $d101 \neq d102$. In this case, there is an error in a time deviation obtained by offsetting the two one-way delays. In addition, an extra time deviation may be introduced by different processing delays of the base station and the terminal device due to different hardware processing capabilities of the base station and the terminal device. Different errors are introduced when different timestamping manners are used for timestamp writing/reading (for example, an error introduced by timestamping on a MAC-PHY layer is less than an error introduced by timestamping on an application layer). However, a low-error timestamping manner requires addition of dedicated hardware, which causes an increase in costs and power consumption. Finally, one time of time synchronization requires a plurality of times of transmission of synchronization packets and follow-up packets, occupying a relatively large quantity of network communication resources.

SUMMARY

Embodiments of the present invention provide a time deviation determining method, a terminal, and a base station, to improve time deviation determining precision, reduce network communication resources occupied in a determining process, and reduce a requirement for hardware.

According to an aspect, an embodiment of this application provides a method for determining a clock time deviation between a terminal and a base station. The method includes: determining, by the terminal, an uplink timing advance TA between the terminal and the base station, and determining a one-way transmission delay Q1 based on TA, and determining, by the terminal, the clock time deviation between the terminal and the base station based on the one-way transmission delay Q1 and a time difference between a base-station clock time and a terminal clock time of a same system frame.

In a possible design, the method includes: determining, by the terminal, the uplink timing advance TA between the terminal and the base station, and determining the one-way transmission delay Q1 based on TA. The base station uses, as a first system frame, any system frame existing after downlink synchronization between the base station and the terminal is completed, determines a base-station clock time T1 of the first system frame, and sends, to the terminal, a first packet including the base-station clock time T1 of the first system frame. After receiving the first packet, the terminal determines a terminal clock time T2 of the first system frame. The terminal deducts the one-way transmission delay Q1 from a time interval between T1 and T2, to obtain the time deviation between the terminal and the base station.

In one embodiment, the first packet sent by the base station to the terminal further includes a frame number of the first system frame, and the terminal determines the frame number of the first system frame based on the received first packet.

In one embodiment, the first system frame determined by the base station is a preset system frame, and the terminal prestores the frame number of the first system frame. Therefore, the base station does not need to send the frame number of the first system frame to the terminal, and the terminal can determine the frame number of the first system frame, to determine a number of frames spaced between the first system frame and a second system frame.

In one embodiment, the first system frame is a plurality of system frames at an interval of a preset period or a preset number of frames, so that the base station and the terminal can determine the clock time deviation between the base station and the terminal when each first system frame is transmitted.

In one embodiment, the base station sends the first packet to a plurality of terminals simultaneously through broadcasting. In this way, clock time deviations between the base station and the plurality of terminals can be determined through one time of broadcasting.

In one embodiment, the base station sends a random access response message to the terminal, where the random access response message includes the uplink timing advance, and the terminal determines the uplink timing advance by receiving the random access response message.

In one embodiment, the base station sends the random access response message to the terminal, where the random access response message includes a correction value of the uplink timing advance, and the terminal corrects the determined uplink timing advance based on the correction value of the uplink timing advance.

According to another aspect, an embodiment of this application provides a method for determining a clock time deviation between a terminal and a base station. The method includes: determining, by the terminal, an uplink timing advance TA between the terminal and the base station, determining a one-way transmission delay Q1 based on TA, and determining the clock time deviation between the terminal and the base station based on the one-way transmission delay Q1, a time difference between a base-station clock time of a system frame in two system frames and a terminal clock time of a following system frame in the two system frames, and a time difference between the two system frames.

In one embodiment, the method includes: determining, by the terminal, the uplink timing advance TA between the terminal and the base station, and determining the one-way transmission delay Q1 based on TA. The base station uses, as a first system frame, any system frame existing after downlink synchronization between the base station and the terminal is completed, determines a base-station clock time T1 of the first system frame, and sends, to the terminal, a packet including the base-station clock time T1 of the first system frame. After receiving the first packet, the terminal uses, as a second system frame, any system frame following the first system frame, and determines a terminal clock time T2 of the second system frame. The terminal determines a number of frames spaced between the first system frame and the second system frame, and calculates an inter-frame time difference Q2 between the first system frame and the second system frame by multiplying the number of spaced frames by duration of one system frame. The terminal deducts the one-way transmission delay Q1 and the inter-frame time difference Q2 from a time interval between T1 and T2, to obtain the time deviation between the terminal and the base station.

In one embodiment, the one-way transmission delay Q1 is determined based on the uplink timing advance TA and a sampling time Ts of a network in which the terminal is located, where $Q1 = TA \times 8 \times Ts$.

In one embodiment, after determining the first system frame, the base station further determines a system frame cycle period P1 to which the first system frame belongs, and the first packet sent by the base station further includes the system frame cycle period P1 to which the first system frame belongs. After receiving the first packet and determining the second system frame, the terminal further determines a system cycle period P2 to which the second system frame belongs. The terminal determines the number of spaced frames based on a frame number of the first system frame, a frame number of the second system frame, and a number of cycle periods spaced between the first system frame and the second system frame. The number of spaced frames is determined based on the number of cycle periods, so that an interval between the second system frame and the first system frame is greater than one period. In this way, a range for selecting the second system frame is expanded, and an occasion for determining the time deviation by the terminal is more flexible.

In one embodiment, when the base station determines the first system frame or the terminal determines the second system frame, a base-station clock time (when the base station determines the first system frame) or a terminal clock time (when the terminal determines the second system frame) T0 of any system frame that is before the first system frame or the second system frame may be recorded first, and the system cycle period to which the first system frame or the second system frame belongs is determined based on duration of one system cycle period and a time difference between T0 and the base-station time T1 of the first system frame or the terminal time T2 of the second system frame.

In one embodiment, the second system frame determined by the terminal is in a system cycle period following the first system frame, so that the terminal can directly determine, based on a frame number difference between the second system frame and the first system frame, the number of frames spaced between the first system frame and the second system frame.

In one embodiment, the first packet sent by the base station further includes the frame number of the first system frame, so that the terminal can determine the frame number of the first system frame based on the first packet, and the base station can determine the first system frame more flexibly.

In one embodiment, the first system frame determined by the base station is a preset system frame, and the terminal prestores the frame number of the first system frame. Therefore, the base station does not need to send the frame number of the first system frame to the terminal, and the terminal can determine the frame number of the first system frame, to determine the number of frames spaced between the first system frame and the second system frame.

In one embodiment, the base station sends a random access response message to the terminal, where the random access response message includes the uplink timing advance, and the terminal determines the uplink timing advance by receiving the random access response message.

In one embodiment, the base station sends the random access response message to the terminal, where the random access response message includes a correction value of the uplink timing advance, and the terminal corrects the determined uplink timing advance based on the correction value of the uplink timing advance.

In one embodiment, when the base station determines the base-station clock time of the first system frame or the terminal determines the terminal clock time of the second system frame, a base-station clock time or a terminal clock time corresponding to a system frame with the frame number is recorded at a physical layer based on the frame number of the first system frame (when the base station is an execution body) or the second system frame (when the terminal is an execution body). Recording a time at the physical layer can improve accuracy of the recorded time.

In one embodiment, the base station sends the first packet to a plurality of terminals simultaneously through broadcasting. In this way, clock time deviations between the base station and the plurality of terminals can be determined through one time of broadcasting.

According to another aspect, an embodiment of this application provides a method for determining a clock time deviation between a terminal and a base station. The method includes: determining, by the terminal, an uplink timing advance TA between the terminal and the base station, determining a one-way transmission delay Q1 based on TA, and determining the clock time deviation between the terminal and the base station based on the one-way transmission delay Q1 and a time difference between a base-station clock time at which the base station sends a packet and a terminal clock time at which the terminal receives the same packet.

In one embodiment, the method includes: determining, by the terminal, the uplink timing advance TA between the terminal and the base station, and determining the one-way transmission delay Q1 based on TA. The base station sends a synchronization packet to the terminal, and sends, to the terminal, a base-station clock time T1 of sending the synchronization packet. The terminal receives the synchronization packet, and obtains T1 and a terminal clock time T2 of receiving the synchronization packet. The terminal deducts the one-way transmission delay Q1 from a time interval between T1 and T2, to obtain the time deviation between the terminal and the base station.

In one embodiment, the one-way transmission delay Q1 is determined based on the uplink timing advance TA and a sampling time Ts of a network in which the terminal is located, where $Q1=TA \times 8 \times Ts$.

In one embodiment, when the base station sends the synchronization packet or the terminal receives the synchronization packet, the base station (when recording a sending time) or the terminal (when recording a receiving time) records, at a physical layer, a base-station clock time of sending the synchronization packet or a terminal clock time of receiving the synchronization packet. In this way, the sending time or the receiving time of the synchronization packet can be determined more precisely.

In one embodiment, the base station sends, to the terminal, a follow-up packet corresponding to the synchronization packet, where the follow-up packet includes the sending time T1 of the synchronization packet. In this way, the terminal can obtain the sending time T1 of the synchronization packet by receiving the follow-up packet.

In one embodiment, when sending the synchronization packet to the terminal, the base station records, at the physical layer, the base-station clock time T1 of sending the synchronization packet, and sends T1 to the terminal by recording T1 in the synchronization packet through timestamping. Therefore, the base station can send T1 to the terminal without additionally sending the follow-up packet.

In one embodiment, the base station sends a random access response message to the terminal, where the random access response message includes the uplink timing advance, and the terminal determines the uplink timing advance by receiving the random access response message.

In one embodiment, the base station sends the random access response message to the terminal, where the random access response message includes a correction value of the uplink timing advance, and the terminal corrects the determined uplink timing advance based on the correction value of the uplink timing advance.

According to still another aspect, an embodiment of this application provides a method for performing clock synchronization between a terminal and a base station. The method includes: after determining a clock time deviation between the terminal and the base station according to the method in the foregoing aspects, correcting, by the terminal, a terminal clock based on the clock time deviation, to perform synchronization with a base-station clock.

According to still another aspect, an embodiment of this application provides a method for performing clock synchronization between a terminal and a base station. The method includes: determining, by the terminal, an uplink timing advance TA between the terminal and the base station, and determining a one-way transmission delay Q1 based on TA; sending, by the base station, a synchronization packet to the terminal, and sending, to the terminal, a base-station clock time T1 of sending the synchronization packet; and when receiving the synchronization packet, obtaining, by the terminal, T1, obtaining a synchronization time T2 by adding T1 and the one-way transmission delay Q1, and using T2 as a clock time of the terminal, to complete clock synchronization between the terminal and the base station.

According to still another aspect, an embodiment of the present invention provides a base station. The base station has a function of implementing behavior of the base station in the method in the foregoing aspects. The function may be implemented by hardware, or may be implemented by hardware executing corresponding software. The hardware or software includes one or more modules corresponding to the foregoing function.

In one embodiment, a structure of the base station includes a processor and a transmitter. The processor is configured to support the base station in performing a corresponding function in the foregoing method. The transmitter is configured to support communication between the base station and UE, and send, to the UE, information or an instruction that is used in the foregoing method. The base station may further include a memory. The memory is configured to be coupled to the processor, and the memory stores a program instruction and data that are necessary for the base station.

According to still another aspect, an embodiment of the present invention provides UE. The UE has a function of implementing behavior of the UE in the foregoing method design. The function may be implemented by hardware, or may be implemented by hardware executing corresponding software. The hardware or software includes one or more modules corresponding to the foregoing function. The module may be software and/or hardware.

In one embodiment, a structure of the UE includes a receiver and a processor. The receiver is configured to support the UE in receiving a packet sent by the base station to the terminal, and obtain information in the packet. The processor controls the UE to determine a clock deviation between the terminal and the base station or perform clock synchronization based on packet information and a processing procedure in the foregoing method. The terminal may further include a memory. The memory is configured to be coupled to the processor, and the memory stores a program instruction and data that are necessary for the terminal.

According to still another aspect, an embodiment of the present invention provides a communications system. The system includes the base station and the UE in the foregoing aspects, or the system includes the base station and a network entity in the foregoing aspects, or the system includes the base station, the UE and a network entity in the foregoing aspects.

According to yet another aspect, an embodiment of the present invention provides a computer storage medium, configured to store a computer software instruction used by the foregoing base station, where the computer software instruction includes a program that is designed for executing the foregoing aspects.

According to yet another aspect, an embodiment of the present invention provides a computer storage medium, configured to store a computer software instruction used by the foregoing UE, where the computer software instruction includes a program that is designed for executing the foregoing aspects.

In the embodiments of the present invention, the time deviation between the terminal and the base station can be determined through only one time of packet communication between the base station and the terminal. This reduces a number of transmission times of the synchronization packet, and saves system resources and network resources that are occupied for transmitting the synchronization packet. In addition, a terminal time and a base-station time are determined by using a system frame time in a frame synchronization mechanism, so that the terminal can determine the time deviation at any time after obtaining the packet. This improves flexibility. Furthermore, compared with a transmission delay that is canceled through one time of round-trip packet exchange in the prior art, the one-way transmission delay obtained based on the uplink timing advance has higher precision. Therefore, precision of the time deviation obtained in the embodiments of the present invention is correspondingly higher.

BRIEF DESCRIPTION OF DRAWINGS

The following describes in more detail the embodiments of the present invention with reference to accompanying drawings.

DESCRIPTION OF EMBODIMENTS

To make the objectives, technical solutions, and advantages of the present invention clearer, the following further describes the embodiments of the present invention in detail with reference to the accompanying drawings.

Figure 1:
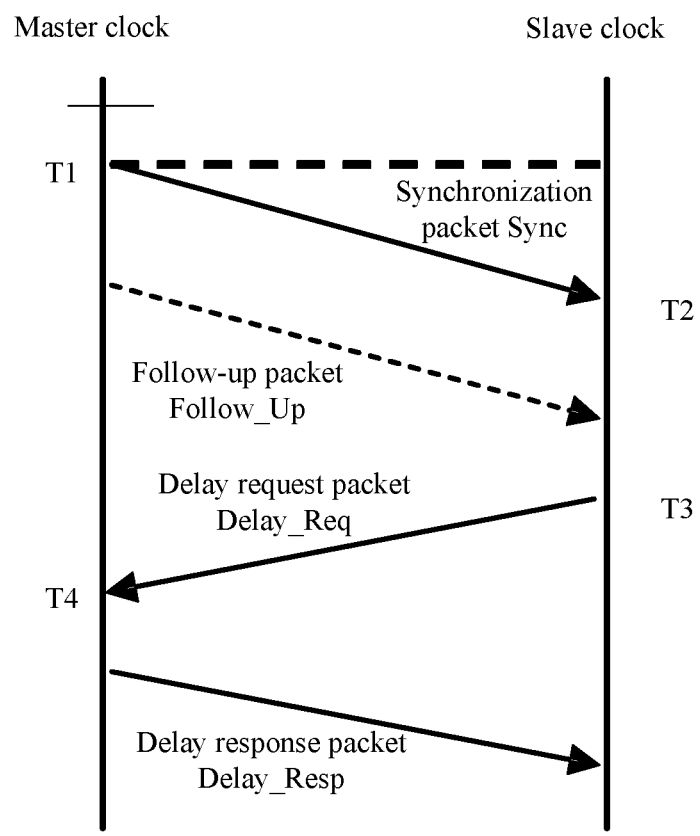
FIG. 1 is a schematic diagram of a time deviation determining method in the prior art.
Figure 2:
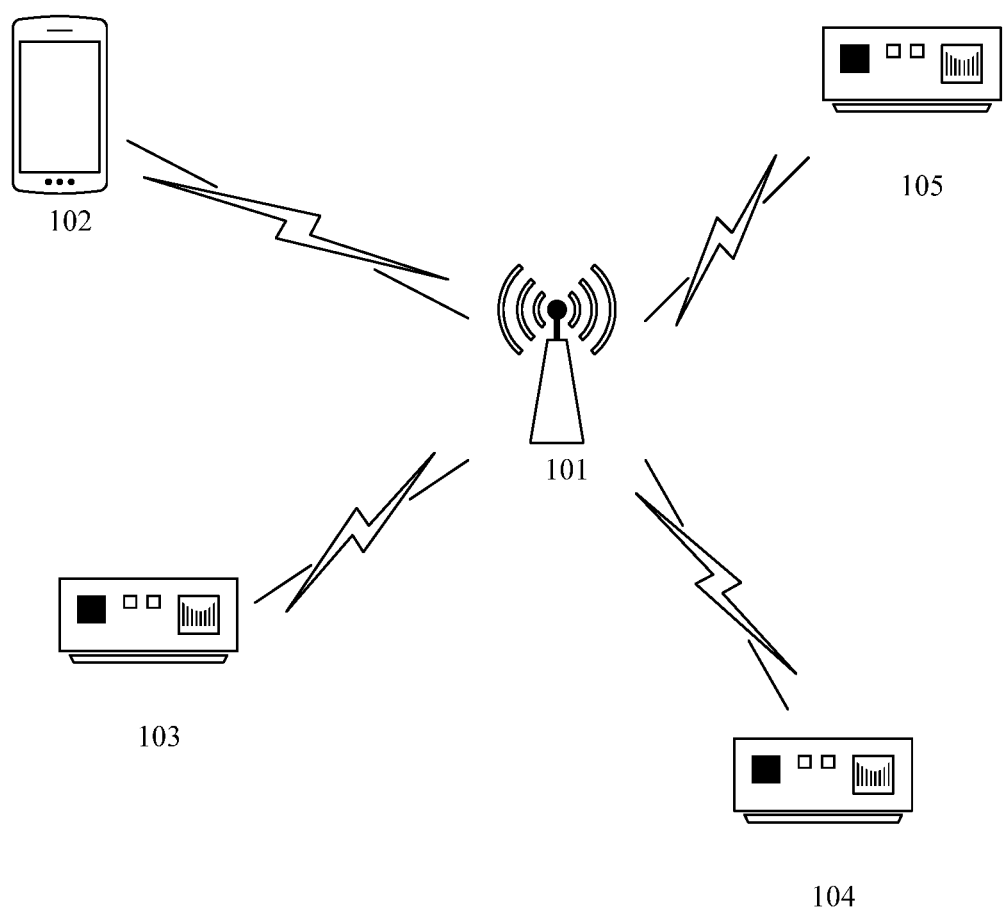
FIG. 2 is a schematic diagram of a possible application scenario for implementing embodiments of the present invention.

FIG. 2 is a schematic diagram of an implementation environment related to one embodiment of the present invention. In one embodiment of the present invention, interaction between one base station and one terminal device is mainly described. However, in specific application of the embodiments of the present invention, there may be a plurality of base stations and a plurality of terminal devices, and a manner of interaction between the base stations and the terminal devices is the same as that described in the embodiments of the present invention. In FIG. 2, only an implementation environment including one base station and a plurality of terminal devices within a communication range of the base station is described.

A network environment in the embodiments of the present invention is a wireless network in which an uplink timing advance mechanism and/or a downlink frame synchronization mechanism are/is used. Specifically, the uplink timing advance mechanism is widely applied to existing 2G, 3G, and 4G networks, for example, TDMA (Time Division Multiplexing Access), TD-SCDMA (Time Division-Synchronous Code Division Multiple Access), CDMA2000 (Code Division Multiple Access 2000), and various 4G network systems that use an OFDM (Orthogonal Frequency Division Multiplexing) technology. Timing advance principles of these systems (except the CDMA2000) are similar, where a base station obtains a delay of each terminal by detecting an PRACH channel, and then notifies the terminal of a timing advance by using a downlink channel. The downlink frame synchronization mechanism is widely applied to various wireless network systems, where the wireless network systems maintain relative synchronization of downlink frames through channel synchronization. It should be understood that with development of wireless network technologies, the technology described in the present invention may be further applied to an evolved system subsequent to an LTE system, such as a 5th Generation 5G system, and other network systems that use the uplink timing advance mechanism and/or the downlink frame synchronization mechanism or other mechanisms whose principles are the same as or similar to that of the uplink timing advance mechanism and/or the downlink frame synchronization mechanism.

In this application, a terminal device may include various Internet of Things devices, smart grid devices, handheld devices, in-vehicle devices, wearable devices, computing devices, or other processing devices connected to a wireless modem, where the devices have a wireless communication function, and user equipment (UE for short) in various forms, such as a mobile station MS for short), a terminal, and terminal equipment. For ease of description, the devices mentioned above are all referred to as terminal devices in this application. A base station (BS for short) in the present invention is an apparatus that is deployed in a radio access network and that is configured to provide a wireless communication function for UE. The base station may include various forms of macro base stations, micro base stations, relay stations, access points, and the like. A device with a base station function may have different names in systems that use different radio access technologies. For example, the device is referred to as an evolved NodeB (eNB or eNodeB for short) in an LTE network, a NodeB in a 3rd Generation (3G) network, and the like. For ease of description, the apparatuses that provide the wireless communication function for the terminal are all referred to as base stations.

As shown in FIG. 2, a base station 101 communicates with a plurality of terminals including terminals 102, 103, 104, 105, and 106 by using a wireless network. The terminal device may be a mobile communications device such as the terminal 102, a portable smart device such as the terminal 103, or a smart Internet of Things terminal such as the terminals 104, 105, and 106, for example, a smart grid device. It should be understood that the terminals shown in FIG. 2 are merely examples. An inventive idea reflected in the embodiments of the present invention may be used to determine a time deviation between a base station and a terminal in any wireless network that uses the uplink timing advance mechanism and the downlink frame synchronization mechanism.

In a scenario related to some embodiments, the terminal device needs to confirm a time deviation with the base station, to calibrate a clock of the terminal. In a method described in these embodiments, the time deviation may be confirmed by using a mutual communication process between the terminal and the base station, so that a particular terminal in the wireless network completes clock calibration. For example, when the terminal 102 or 103 needs to calibrate a clock of the terminal 102 or 103, the terminal 102 or 103 may complete calibration by using a separate communication process with the base station. In a scenario related to some other embodiments, based on a method described in the embodiments, the base station may communicate with a plurality of terminals simultaneously through broadcasting, so that the base station can implement clock calibration for a plurality of terminals through one time of broadcasting. For example, the base station may broadcast to the terminals 104, 105, and 106 that are in a same network, to confirm time deviations between the base station and the three terminals.

In an illustrative application scenario, the embodiments of the present invention may be applied to an Internet of Things connected in the wireless network, for example, a smart grid. With deepening construction of a smart distribution network and development of active distribution network services brought by high-permeability access of distributed renewable energy, the distribution network has increasingly high requirements for time synchronization precision of the entire network. For example, services such as fault recording and steady state control of the active distribution network are gradually applied to the distribution network. For example, in the fault recording service, information, such as before-fault and post-fault electrical quantities, a non-electrical number, and a Boolean value, is automatically and accurately recorded when the grid fails, a waveform graph showing an entire process before and after the fault is output, then an occurring time, a distance, a nature, and severity of the fault is analyzed through comparison, to give a fault solution. In the fault recording service, data needs to be collected for waveform comparison. Therefore, time precision of the collected data needs to be relatively high. The grid requires that time synchronization precision of a fault recorder is less than 1 ms. In the embodiments of the present invention, the smart grid terminal may confirm the time deviation with the base station by using the method described in the embodiments, to obtain a time deviation that meets a precision requirement and perform time synchronization to meet the foregoing service requirements.

As mentioned above, embodiments of the present invention may be applied to a wireless network system that uses the uplink timing advance mechanism and/or the downlink frame synchronization mechanism or a similar mechanism. In the following embodiments of the present invention, for ease of description, the following embodiments are all designed on a basis of the LTE network, and relate to an uplink timing advance synchronization mechanism in the LTE network. To facilitate understanding of the embodiments of the present invention, the following first describes the uplink timing advance synchronization mechanism. However, it can be understood that specific implementations of the uplink timing advance mechanism and the downlink frame synchronization mechanism in various existing wireless network systems can both be obtained by using the prior art. For specific implementations of the present invention in other wireless network systems that use the uplink timing advance mechanism and/or the downlink frame synchronization mechanism, refer to the embodiments of the present invention.

For an LTE wireless communications system, to implement time-frequency orthogonal multiple access of different terminals, different terminals from a same cell are required not to interfere with each other in uplink transmission. Therefore, an eNB base station requests, to be aligned, times at which signals of different terminals from a same subframe but different frequency domain resources arrive at the eNB base station. However, distances between different terminals in the cell and the eNB base station are different. To ensure time synchronization of receiving the signals of the terminals in the cell by the eNB base station, LTE proposes an uplink synchronization mechanism of an uplink timing advance. From a perspective of a terminal side, a timing advance is in nature a negative offset between a start time at which a downlink subframe is received and a time at which an uplink subframe is transmitted. The eNB base station may properly control an offset of each terminal, to control times at which uplink signals from different UEs arrive at the eNB. For a terminal that is relatively far away from the eNB, because there is a relatively large transmission delay, the terminal needs to send uplink data earlier than a terminal that is relatively close to the eNB.

Therefore, due to the transmission delay between the terminal and the base station, the terminal needs to know the delay (namely, the uplink timing advance) in advance, and in each time of uplink sending, sending is performed twice the delay value in advance. This eliminates a time delay caused in uplink subframe transmission and downlink subframe transmission, and ensures consistency between a time of arriving at the base station and a time of receiving by the base station. Different terminals have different uplink timing advances. In the LTE wireless communications system, a physical layer of the eNB base station obtains an uplink timing advance of each terminal by measuring an uplink signal sent by a physical layer of the terminal, and delivers the uplink timing advance to the corresponding terminal.

There are two manners of determining the uplink timing advance:

A. Initial Uplink Synchronization

In a random access process of the terminal, the physical layer of the eNB base station receives a random access preamble message of the terminal, where the message includes a preamble sequence code. The physical layer of the eNB base station performs an operation on the preamble sequence code and a known preamble, determines the uplink timing advance (TA) value from peak values obtained through the operation, and sends the uplink timing advance to the physical layer of the terminal by using a timing advance command field of a random access response (random access response) message.

B. Uplink Synchronization Update

After the initial uplink synchronization of the terminal, as time changes, a crystal oscillator of the terminal offsets, and offsets accumulated over a long period may cause an uplink timing error. In this case, an uplink synchronization update process is required. Any physical-layer uplink signal (for example, an SRS (sounding reference signal)/a DMRS (De-Modulation Reference Signal)/a CQI (channel quality indication)/an ACK (acknowledgement)/a NACK (negative acknowledgement)/a PUSCH (physical uplink shared channel)) sent by the terminal may be used for measuring the uplink timing advance TA value by the eNB base station. After the measurement, the physical layer of the eNB base station sends a timing advance command to the terminal, to request the terminal to adjust the uplink timing advance TA value.

To sum up, in the uplink synchronization and uplink synchronization update mechanisms based on the existing LTE system, the physical layer of each terminal saves and maintains the uplink timing advance TA value between the terminal and the base station.

Figure 3:
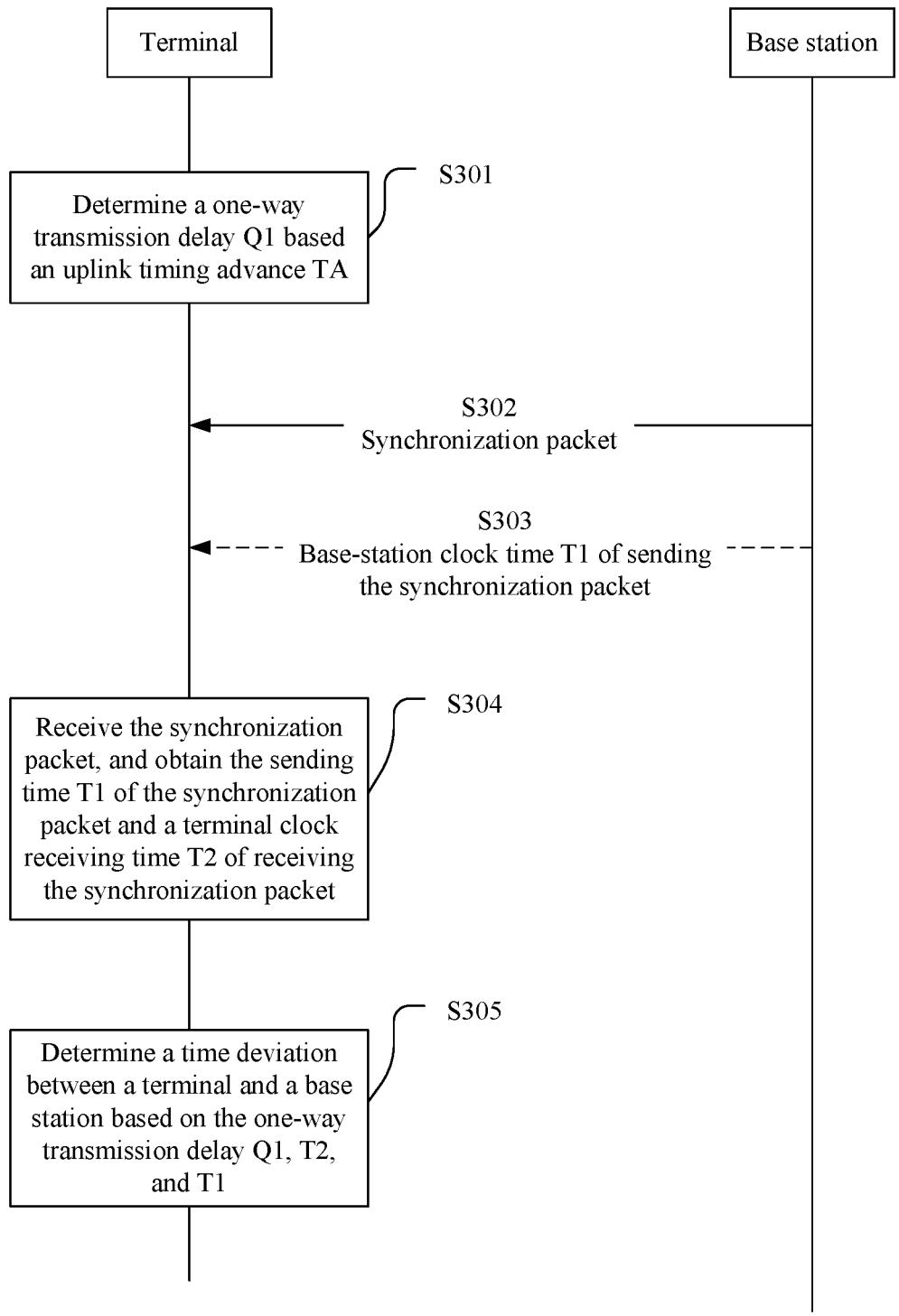
FIG. 3 is a schematic flowchart of a time deviation determining method according to an embodiment of the present invention.

FIG. 3 is a schematic diagram of information exchange according to a first method embodiment of the present invention. In this embodiment, a method for obtaining a time deviation between a terminal and a base station based on the present invention is described. The method includes the following operations.

Operation S301: The terminal determines an uplink timing advance TA between the terminal and the base station in the foregoing initial uplink synchronization manner, and determines a one-way transmission delay Q1 based on the uplink timing advance TA and a sampling time of a network in which the terminal is located.

A nature of an uplink timing advance mechanism is that there is a transmission delay between the UE and the base station, and the UE needs to know the delay in advance. The uplink timing advance is a round-trip information transmission delay between the UE and the base station. In each time of uplink sending, sending is performed twice the one-way transmission delay value in advance. This can ensure consistency between a time of arriving at the base station and a time of receiving by the base station. The base station obtains a delay of each terminal by detecting a RACH channel, and notifies the terminal of the timing advance by using a downlink channel. The one-way delay between the terminal and the base station is half of the uplink timing advance. In different wireless network systems, specifically used sequences are different.

For example, in an LTE system, the round-trip information transmission delay is the uplink timing advance TA×16 Ts, where 16 Ts is a granularity of uplink synchronization, and Ts is a sampling time. In an existing LTE system, 16 Ts is equal to 0.52 μs. The round-trip information transmission delay includes two one-way transmission delays. Therefore, the one-way transmission delay between a physical layer of the UE and a physical layer of the eNB base station is: NTA=TAX 16Ts/2, that is, NTA=TA×8Ts.

In some implementations, the terminal may further update or correct the uplink timing advance in the foregoing uplink synchronization update manner.

Operation S302: The base station sends a synchronization packet to the terminal.

The synchronization packet may be in an NTP/SNTP time synchronization packet format in the prior art, a time synchronization packet format in the IEEE 1588 protocol, or another user-defined packet format, and is used to determine a sending time and a receiving time of the synchronization packet through timestamping.

In one embodiment, the base station separately sends the synchronization packet to a particular terminal, and the synchronization packet may be used by the particular terminal to determine a time deviation. In another possible implementation, the base station simultaneously sends the synchronization packet to all or some terminals in a cell by applying for a broadcast channel or a multicast channel, and the packet may be used by a plurality of terminals receiving the synchronization packet to determine time deviations between the terminals and the base station.

Operation S303: The base station determines a base-station clock time T1 of sending the synchronization packet, and sends T1 to the terminal.

Figure 4:
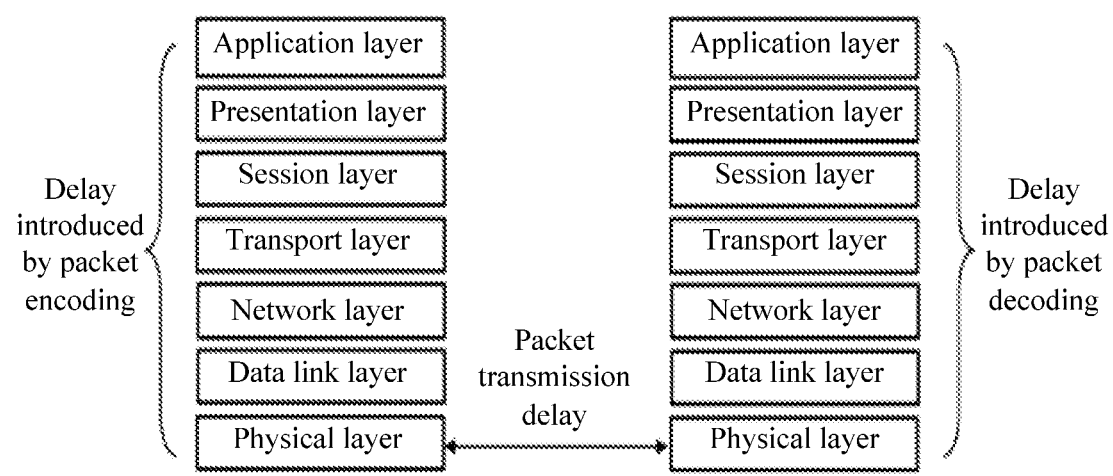
FIG. 4 is a schematic diagram of a principle of an error introduced by recording a timestamp at different system layers.

A manner of determining the sending time of the synchronization packet is performing timestamping. Because of factors such as different implementation and different CPU processing capabilities of protocol layers of the base station and the terminal, there may be a processing delay at each of the base station and the terminal. This additionally introduces a time deviation. As shown in FIG. 4, errors introduced by performing timestamping at different layers are different. If timestamping is performed at a location closer to the physical layer, a smaller time deviation is introduced. For example, when timestamping is performed at an application layer, an additional time error introduced by encoding and decoding at a protocol layer below the application layer is introduced; when timestamping is performed at the physical layer, the time deviation introduced by encoding at the protocol layer can be removed. Therefore, to reduce the additional time error, a preferred implementation is performing timestamping at the physical layer by using a hardware assisted technology.

There are a plurality of manners of sending the determined sending time T1 to the terminal. In a possible implementation, the sending time T1 is carried in the synchronization packet, so that the sending time T1 is sent to the terminal when the synchronization packet is sent to the terminal. In another embodiment, a follow-up packet Follow Up is separately sent to the terminal, and the follow-up packet includes the sending time T1, so that the sending time T1 is sent to the terminal. It can be understood that when the sending time T1 is sent to the terminal by using the follow-up packet, if a corresponding synchronization packet is separately sent to a particular terminal, the follow-up packet is also sent to the terminal; or when a corresponding synchronization packet is sent to a plurality of terminals in a cell by using a broadcast channel or a multicast channel, the follow-up packet is also sent to the plurality of terminals in the same manner.

Operation S304: The terminal receives the synchronization packet, and obtains the sending time T1 of the synchronization packet and a terminal clock receiving time T2 of receiving the synchronization packet.

There are a plurality of manners of obtaining the terminal clock receiving time T2 of receiving the synchronization packet. A common manner is determining the receiving time T2 through timestamping. As shown in FIG. 4, errors introduced by performing timestamping at different layers are different. If timestamping is performed at a location closer to the physical layer, a smaller time deviation is introduced. Therefore, similar to timestamping performed by the base station, a preferred implementation is that when receiving the synchronization packet, the terminal records, between a MAC layer and the physical layer by using a hardware assisted technology, a terminal clock timestamp T2 of receiving the synchronization packet.

Operation S305: Determine a time deviation between the terminal and the base station based on the one-way transmission delay Q1, T2, and T1, where the time deviation between the terminal and the base station is duration obtained after the one-way transmission delay Q1 is deducted from a time interval between T1 and T2.

From a perspective of a time synchronization principle, a time difference between a master-clock sending time of a packet and a slave-clock receiving time of the same packet includes a delay caused in a packet transmission process and a time deviation between a master clock and a slave clock. In the packet transmission process, when a network environment and relative positions of the terminal and the base station do not change, a transmission distance and a transmission delay between the terminal and the base station are fixed, that is, the one-way transmission delay Q1 determined by using the uplink timing advance can be used to replace a transmission delay caused by sending the synchronization packet from the base station to the terminal. That is, in this embodiment, the time interval between T1 and T2 includes the time deviation X between the master clock (namely, a base-station clock) and the slave clock (namely, a terminal clock) and the one-way transmission delay Q1. Therefore, the time deviation between the terminal and the base station is the duration obtained after the one-way transmission delay Q1 is deducted from the time interval between T1 and T2. Generally, the time deviation X between the terminal and the base station may be directly obtained by using T2−T1−Q1. Certainly, it can be understood that other manners, for example, multiplying the parameter T2, T1, or Q1 by a coefficient to correct a value of the parameter T2, T1, or Q1 to some extent, or floating a difference of T2−T1−Q1 within an allowable error range, do not depart from a substantive meaning of this embodiment of the present invention.

In this embodiment of the present invention, first, the one-way transmission delay is determined by using the uplink timing advance, and the one-way transmission delay is used as a delay time of synchronization packet transmission. Then, the time deviation between the terminal and the base station is determined based on the base-station time at which the base station sends the synchronization packet and the terminal time at which the terminal receives the synchronization packet. Compared with the prior art, in this embodiment of the present invention, the time deviation between the terminal and the base station can be determined through only one time of synchronization packet exchange. This reduces a number of transmission times of the synchronization packet, and saves system resources and network resources that are occupied for transmitting the synchronization packet. In addition, compared with a transmission delay that is canceled through one time of round-trip packet exchange in the prior art, the one-way transmission delay obtained based on the uplink timing advance has higher precision because there is no impact from aspects such as a difference between uplink and downlink transmission speeds and a difference between hardware processing speeds at transmit and receive ends in one time of round-trip packet exchange. Therefore, precision of the time deviation obtained in this embodiment of the present invention is correspondingly higher.

Figure 5A:
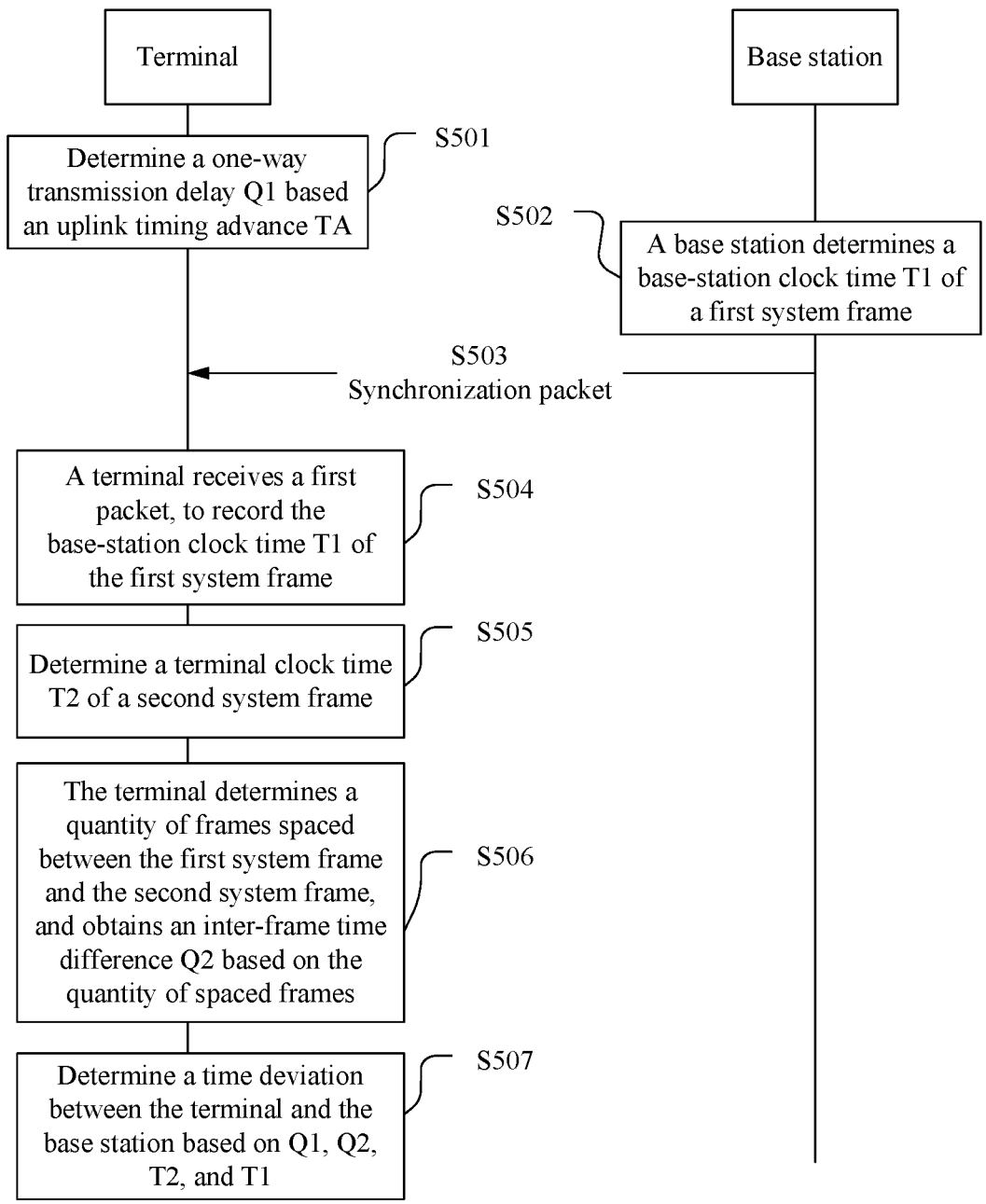
FIG. 5A is a schematic flowchart of another time deviation determining method according to an embodiment of the present invention.
Figure 5B:
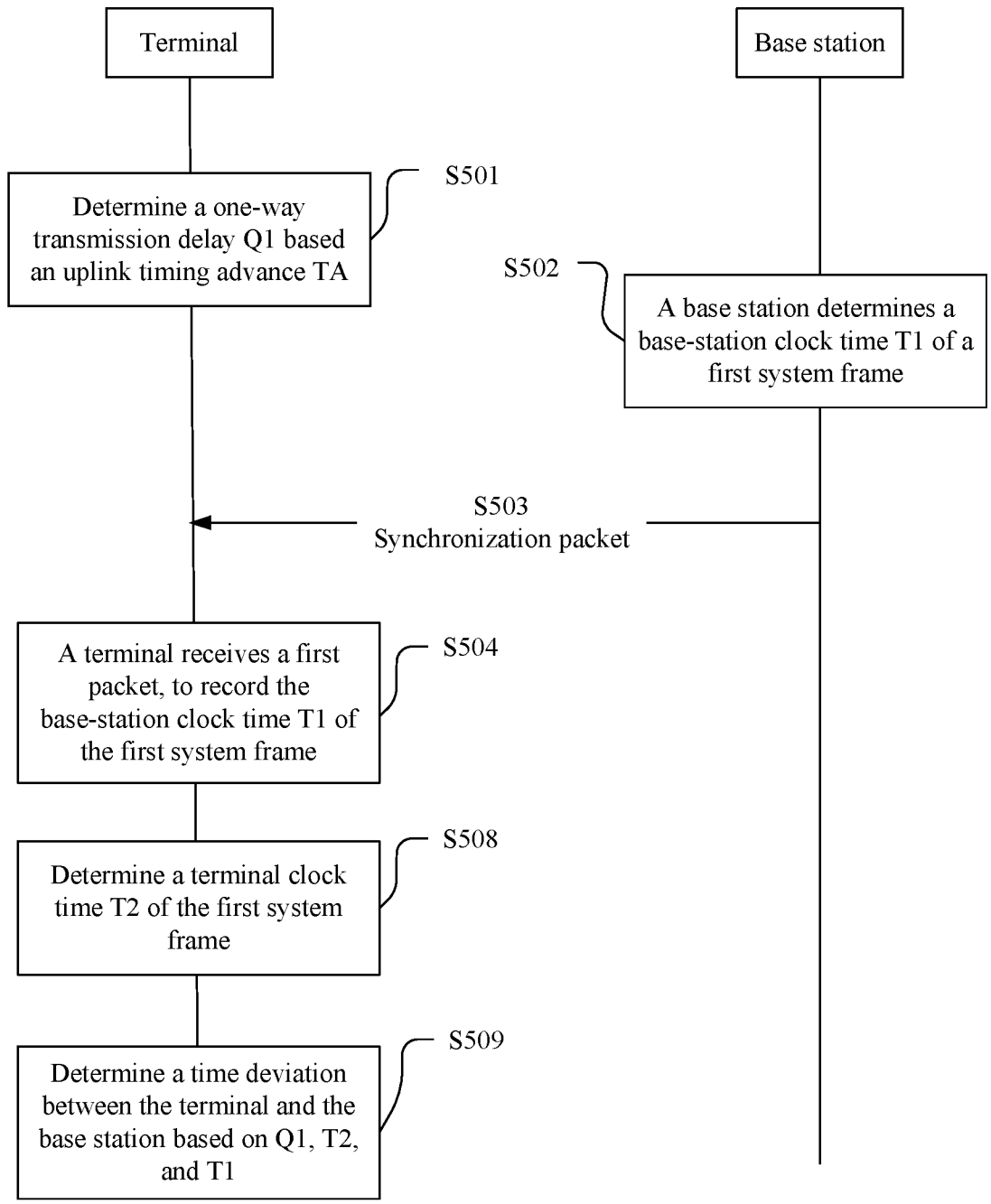
FIG. 5B is a schematic flowchart of still another time deviation determining method according to an embodiment of the present invention.

FIG. 5A and FIG. 5B are schematic diagrams of information exchange in another method embodiment according to an embodiment of the present invention. This embodiment relates to a frame synchronization technology in a wireless communications system. Therefore, the technology is briefly described first by using an LTE system as an example.

Figure 6:
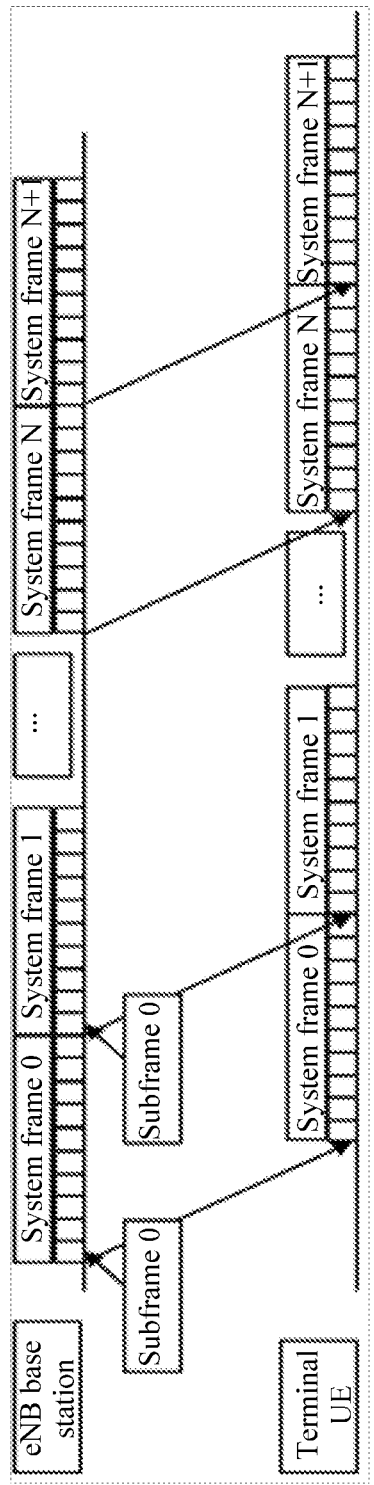
FIG. 6 is a schematic diagram of a principle of a time difference between system frames of a base station and a terminal in a frame synchronization mechanism.

In an LTE wireless communications system, to access an LTE network, UE first needs to perform processes such as cell searching, cell system information obtaining, and random access. In the cell searching process, a physical layer of an eNB base station sends a PSS (primary synchronization signal) and an SSS (secondary synchronization signal). A physical layer of the UE can determine a location of a subframe 0 in a system frame by detecting the PSS/SSS signal, and then determines a system frame number by receiving cell system information. In this way, the UE completes downlink synchronization with the physical layer of the eNB base station, and determines and corresponds to locations and frame numbers of a specific system frame and a subframe of the physical layer of the eNB base station. FIG. 6 is a schematic diagram of system frame synchronization and subframe synchronization between the UE and the eNB base station after downlink synchronization is performed in the LTE system. Rather than absolute-time synchronization, a nature of downlink synchronization is that after receiving the PSS/SSS signal and the cell system information, the physical layer of the UE is synchronized with the physical layer of the eNB base station. For example, a system frame 1 and a subframe 0 of the base station are relatively synchronized with a system frame 1 and a subframe 0 of the UE. In this case, from a perspective of absolute time, that is, assuming that a base-station clock and a terminal clock are totally synchronized, there is actually a one-way transmission delay between a base-station time and a terminal time of a same system frame. However, from a perspective of relative time, that is, when a time difference of a same system frame is calculated separately by using a base-station clock time and a terminal clock time, if there is a deviation between a base-station clock and a terminal clock, the time difference further includes a time difference between the base-station clock time and the terminal clock time in addition to the one-way transmission delay.

After the UE completes downlink synchronization, the UE and the base station each maintain a system frame time. By using a frame number and a subframe number of a particular system frame, the UE can parse out a system frame time, of a terminal clock, corresponding to the system frame. System frame numbers and subframe numbers of the physical layer of the eNB base station are consecutive, and the system frame numbers fall within a range of 0 to 1023. Each system frame includes 10 subframes. One subframe is 1 ms, and each frame is 10 ms. A cycle period of a system frame is 10.24 seconds, and a system frame number cycles once every 10.24 seconds.

Based on the frame synchronization technology, this embodiment provides two specific implementation methods shown in FIG. 5A and FIG. 5B. The implementation method corresponding to FIG. 5A includes the following operations.

Operation S501: A terminal determines an uplink timing advance TA between the terminal and a base station in the foregoing initial uplink synchronization manner, and determines a one-way transmission delay Q1 based on the uplink timing advance TA and a sampling time of a network in which the terminal is located.

A manner of determining the one-way transmission delay Q1 is similar to that in the foregoing embodiment, and details are not described herein again.

Operation S502: The base station determines a base-station clock time T1 of a first system frame.

The first system frame may be any system frame of the base station. To be specific, the first system frame is a subframe M of a system frame N on a base station side, where N is any integer from 0 to 1023, and M is any integer from 0 to 10. In some implementations, the base station uses, as the first system frame, the initial system frame existing after downlink synchronization is completed, so that the terminal can determine, at any time after downlink synchronization is completed, a clock deviation between the terminal and the base station based on a received second system frame. In some other implementations, a system frame other than the initial system frame may be selected as the first system frame, so that the terminal can determine a clock deviation between the terminal and the base station by using any system frame following the first system frame as a second system frame.

In one embodiment, a base-station clock time of a system frame is usually a base-station clock time corresponding to a specific subframe. That is, T1 is a base-station clock time of a subframe of a specific system frame. However, in some cases, a base-station clock time of a system frame may be directly a base-station clock time of a system frame, without considering a specific subframe in the system frame. For example, in some implementations, both the terminal and the base station always use, as a base-station clock time of each system frame, a base-station clock time corresponding to the first subframe in the system frame. In this case, in these embodiments, a base-station clock time of a system frame is a base-station clock time of the first subframe in the system frame. In some other embodiments, because a requirement for precision is relatively low, there is no need to be accurate to a specific subframe in a system frame, and a sending time of a system frame may be a base-station clock time of any subframe in the system frame.

There are a plurality of manners of obtaining the base-station clock time T1 of sending the first system frame. For example, in an implementation, the base-station clock time T1 may be obtained through timestamping. As shown in FIG. 4, errors introduced by performing timestamping at different layers are different. If timestamping is performed at a location closer to the physical layer, a smaller time deviation is introduced. A preferred implementation is that when the base station sends the first system frame, the terminal records, between a MAC layer and the physical layer by using a hardware assisted technology, a terminal clock timestamp of sending the first system frame. In another embodiment, the base-station clock time of the first system frame may be determined based on a base-station clock time of a system frame that has been determined after downlink synchronization between the base station and the UE is completed, a number of frames spaced between the first system frame and the system frame, and duration of each system frame.

In one embodiment, the base station may further determine a system frame cycle period P1 to which the first system frame belongs. System frame numbers and subframe numbers of the physical layer are consecutive, and the system frame numbers fall within a range of 0 to 1023. Each system frame includes 10 subframes. One subframe is 1 ms, and each frame is 10 ms. A cycle period of a system frame is 10.24 seconds, and a system frame number cycles once every 10.24 seconds. Therefore, if a time difference between the first system frame and the second system frame is greater than one cycle period, the time difference between the first system frame and the second system frame cannot be determined directly based on frame numbers. In this case, the base station needs to first determine the system frame cycle period to which the first system frame belongs.

To determine a cycle period of a system frame, the base station may select any system frame in a start system cycle period as a reference frame, and records a sending time of the reference frame in advance. After the base-station clock time of the first system frame is determined, the cycle period to which the first system frame belongs can be determined by dividing a time difference between the sending time of the reference frame and the sending time of the system frame by cycle duration of each system frame cycle period.

A possible implementation of determining the system frame cycle period P1 to which the first system frame belongs is: after downlink synchronization is performed, determining a base-station clock time of the initial system frame, namely, a subframe 0 of a system frame 0 in a cycle period. After a time of a subframe M of a system frame N of the base station is determined, a time difference time (ms) between the time of the subframe 0 and the time of the subframe M can be calculated. A cycle period P to which the subframe M of the system frame N of the base station belongs is obtained by rounding up (or rounding down if the base station starts from a cycle period 0) a value obtained by dividing time by 10240.

S503: The base station sends a first packet to the terminal, where the first packet includes the base-station clock time T1 of the first system frame.

The base station sends, to the terminal by sending the first packet, the determined base-station clock time T1 of sending the first system frame. The first packet may be a new packet that is separately sent for carrying information about T1. Alternatively, an existing packet communicated between the base station and the terminal may be used as the first packet to carry information about T1.

In one embodiment, the base station may simultaneously send the first packet to a plurality of terminals in a cell by using a broadcast channel or a multicast channel, so that all terminals that are broadcast or multicast targets in the cell can perform time deviation determining based on the first packet or T1.

In one embodiment, when the base station further determines the system frame cycle period P1 to which the first system frame belongs, the first packet may further carry the determined cycle period P1.

In one embodiment, the terminal and the base station may determine a particular frame as the first system frame through agreement or presetting. In this case, a system frame number or both a frame number and a subframe number (based on the foregoing descriptions, when only a system frame is used as a determining granularity of T1, only a frame number needs to be determined; or when a subframe of a system frame is used as a determining granularity of T1, a frame number and a subframe number need to be determined) of the first system frame corresponding to T1 is/are known to the base station and the terminal. Therefore, the base station does not need to inform the terminal of the system frame number or both the frame number and the subframe number of the first system frame. However, in another possible implementation, the first system frame is selected by the base station, and an agreement manner or a presetting manner is not used for the terminal to know a system frame number or both a frame number and a subframe number of the first system frame. In the latter implementation, in addition to T1, the first packet needs further to carry related information for determining the first system frame, such as the system frame number or both the frame number and the subframe number, so that the terminal can determine, based on the information, which system frame is specifically the first system frame.

Operation S504: The terminal receives the first packet, to record the base-station clock time T1 of the first system frame.

Correspondingly, in one embodiment, when the first packet further carries the system frame cycle period P1 to the first system frame belongs, the terminal further records the cycle period P1 based on the first packet. When the first packet further carries the related information of the first system frame, the terminal further determines the frame number or both the frame number and the subframe number of the first system frame based on the first packet.

Operation S505: When the terminal needs to determine a current clock time deviation between the terminal and the base station, the terminal uses a currently most recent system frame as a second system frame, and determines a terminal clock time T2 of the second system frame.

The currently most recent system frame may be the last system frame before a current time point, or may be the initial system frame after a current time point. Using the currently most recent system frame as the second system frame can ensure that a time deviation determined based on a receiving time of the system frame is the clock time deviation between the terminal and the base station at the current time point.

There are a plurality of manners of obtaining the terminal clock time T2 of the second system frame. For example, in an implementation, the time T2 is determined through timestamping. Therefore, similar to timestamping performed by the base station, a preferred implementation is that when receiving the second system frame, the terminal records, between a MAC layer and a physical layer by using a hardware assisted technology, a terminal clock timestamp T2 of the second system frame. In another implementation, after downlink synchronization between the base station and the UE is completed, the UE can determine the terminal clock time of the second system frame based on a terminal clock time of a system frame that has been determined, a number of frames spaced between the second system frame and the system frame, and duration of each system frame.

In one embodiment, when a time interval between the second system frame and the first system frame exceeds one system frame cycle period, a cycle period P2 to which the second system frame belongs further needs to be determined.

To determine a cycle period of a system frame, the terminal may select any system frame in a start system cycle period as a reference frame, and records in advance a terminal clock time of receiving the reference frame. After the terminal clock time of the second system frame is determined, the cycle period to which the second system frame belongs can be determined by dividing a time difference between the terminal clock time of the reference frame and the terminal clock time of the system frame by cycle duration of each system frame cycle period.

A possible implementation of determining the system frame cycle period P2 to which the second system frame belongs is: after downlink synchronization is performed, determining a terminal clock time of the initial system frame, namely, a subframe 0 of a system frame 0 in a cycle period. Then, after a terminal clock time of a subframe M of a system frame Ns determined, a time difference time (ms) between the time of the subframe 0 and the time of the subframe M can be calculated. A cycle period P to which the subframe M of the system frame N of the terminal belongs is obtained by rounding up (or rounding down if the base station starts from a cycle period 0) a value obtained by dividing time by 10240.

Operation S506: The terminal determines a number of frames spaced between the first system frame and the second system frame, and obtains an inter-frame time difference Q2 based on the number of spaced frames, where the inter-frame time difference Q2 is a product of the number of spaced frames and duration of one system frame.

As mentioned above, a frame number of the first system frame may be determined through pre-agreement with the base station or through presetting. Alternatively, a frame number of the first system frame may be determined by receiving frame number information of the first system frame carried in the first packet.

In one embodiment, an interval between the first system frame and the second system frame is less than one system frame cycle period. System frame numbers and subframe numbers of the physical layer are consecutive. The system frame numbers fall within a range of 0 to 1023, and each system frame includes 10 subframes. Therefore, the number of frames spaced between the first system frame and the second system frame may be determined directly based on frame numbers or both frame numbers and subframe numbers of the first system frame and the second system frame. For example, the first system frame is a subframe 2 of a system frame 10, and the second system frame is a subframe 3 of a system frame 5. Because the second system frame is after the first system frame, and both the second system frame and the first system frame are in a same period, that is, the second system frame is in a period following the first system frame, the number of frames spaced between the second system frame and the first system frame is 10191. Likewise, if a system frame is directly used as a granularity for determining the sending time and the receiving time, a system frame number difference is calculated directly, without calculating subframe numbers. A principle thereof is the same as the foregoing.

In one embodiment, an interval between the first system frame and the second system frame is greater than one system frame cycle period. In this case, with reference to the foregoing, the terminal obtains, by using the first packet, the system cycle period P1 to which the first system frame belongs, and determines the system cycle period P2 to which a second system frame belongs. The number of frames spaced between the first system frame and the second system frame can be determined based on the system cycle period P1 to which the first system frame belongs, the system cycle period P2 to which the second system frame belongs, and frame numbers of the first system frame and the second system frame. For example, the second system frame received by the terminal is a subframe 1 of a system frame 5 in a cycle period 7, and the first system frame is a subframe 0 of a system frame 2 in a cycle period 3. In this case, there are 40991 subframes spaced between the first system frame and the second system frame. Likewise, if a system frame is directly used as a granularity for determining the sending time and the receiving time, a system frame number difference is calculated directly, without calculating subframe numbers. A principle thereof is the same as the foregoing.

Operation S507: The terminal determines a time deviation between the terminal and the base station, where the time deviation is duration obtained after the one-way transmission delay Q1 and the inter-frame time difference Q2 are deducted from a time interval between T1 and T2.

Based on the foregoing descriptions of a frame synchronization principle, a time difference between a base-station clock time and a terminal clock time of a same system frame includes the one-way transmission delay explained above and the clock time deviation between the terminal and the base station. When a network environment and relative positions of the terminal and the base station do not change, a transmission distance and a transmission delay between the terminal and the base station are fixed, that is, the one-way transmission delay Q1 determined by using the uplink timing advance may be used to replace the one-way transmission delay carried by the same system frame. Further, time differences between base-station clock times and terminal clock times of different frames further include inter-frame time differences between the different frames in addition to one-way transmission delays and clock time deviations between the terminal and the base station. With reference to this embodiment, the time interval between T1 and T2 includes the time deviation X between a master clock (namely, a base-station clock) and a slave clock (namely, a terminal clock), the one-way transmission delay Q1, and the inter-frame time difference Q2. Therefore, the time deviation is the duration obtained after the one-way transmission delay Q1 and the inter-frame time difference Q2 are deducted from the time interval between T1 and T2. Generally, the time deviation X between the terminal and the base station may be directly obtained by using T2−T1−Q1−Q2. Certainly, it can be understood that other manners, for example, multiplying the parameter T2, T1, Q1, or Q2 by a coefficient to correct a value of the parameter T2, T1, Q1, or Q2 to some extent, or floating a difference of T2−T1−Q1−Q2 in an allowable error range, do not depart from a substantive meaning of this embodiment of the present invention.

In this implementation of this embodiment of the present invention, first, the one-way transmission delay is determined based on the uplink timing advance, and the one-way transmission delay is used as a one-way delay time of a same system frame between the base-station clock and the terminal clock. Then, the terminal determines the time deviation between the terminal and the base station based on the base-station clock time of the first system frame carried in the first packet, the terminal clock time of the second system frame, and the inter-frame time difference between the first system frame and the second system frame. Compared with the prior art, in this embodiment of the present invention, the time deviation between the terminal and the base station can be determined through only one time of communication, of the first packet, between the base station and the terminal. This reduces a number of transmission times of a synchronization packet, and saves system resources and network resources that are occupied for transmitting the synchronization packet.

In addition, the terminal can select any system frame following the first system frame as the second system frame, so that the terminal can determine the time deviation at any time according to a requirement of the terminal. This significantly improves flexibility compared with the prior art. In addition, compared with a transmission delay that is canceled through one time of round-trip packet exchange in the prior art, the one-way transmission delay obtained based on the uplink timing advance has higher precision because there is no impact from aspects such as a difference between uplink and downlink transmission speeds and a difference between hardware processing speeds at transmit and receive ends in one time of round-trip packet exchange. Therefore, precision of the time deviation obtained in this embodiment of the present invention is correspondingly higher.

FIG. 5B shows another implementation according to this embodiment. In this implementation, the terminal no longer determines the second system frame. Instead, the terminal directly records a terminal clock time T2 of the first system frame, and calculates a clock deviation between the terminal and the base station based on the terminal clock time T2 of the first system frame.

In this implementation, operations S501 to S504 are the same as the implementation corresponding to FIG. 5A. For details, refer to the foregoing descriptions, and details are not described herein again.

After operation S504, operations S508 and S509 performed by the terminal are different from the implementation corresponding to FIG. 5A. Details are as follows:

Operation S508: The terminal determines a terminal clock time T2 of the first system frame.

In this implementation, the terminal directly determines a terminal time of the first system frame as T2, and the first system frame is a same system frame as the first system frame determined by the base station. A manner of obtaining the terminal time T2 of the first system frame is the same as the manner of determining the terminal time of the second system frame in the foregoing implementation. For details, refer to the foregoing descriptions.

Operation S509: The terminal determines a time deviation between the terminal and the base station, where the time deviation is duration obtained after the one-way transmission delay Q1 is deducted from a time interval between T1 and T2.

Because the system frame directly determined by the terminal is the first system frame determined by the base station, a time difference between the base-station clock time and the terminal clock time that are corresponding to the system frame includes the one-way transmission delay Q1 and the clock time deviation between the terminal and the base station. Therefore, the time deviation is the duration obtained after the one-way transmission delay Q1 is deducted from the time interval between T1 and T2. Generally, the time deviation X between the terminal and the base station may be directly obtained by using T2−T1−Q1. Certainly, it can be understood that other manners, for example, multiplying the parameter T2, T1, or Q1 by a coefficient to correct a value of the parameter T2, T1, or Q1 to some extent, or floating a difference of T2−T1−Q1 in an allowable error range, do not depart from a substantive meaning of this embodiment of the present invention.

In this implementation of this embodiment of the present invention, compared with the foregoing implementation, the terminal no longer selects the second system frame following the first system frame, to determine the terminal clock time T2. Instead, the terminal determines T2 directly by using the first system frame. Therefore, in this implementation, the determined time deviation is obtained by using the terminal clock time and the base-station clock time of the first system frame. Compared with the foregoing implementation in which the terminal may determine the second system frame according to a requirement, that is, the terminal can flexibly determine the terminal clock time corresponding to the second system frame to determine the clock time deviation, flexibility in this implementation is slightly poor. However, for the terminal, steps in this implementation are more simplified. This helps reduce performance and power consumption overheads of the terminal in implementing this solution.

Figure 7:
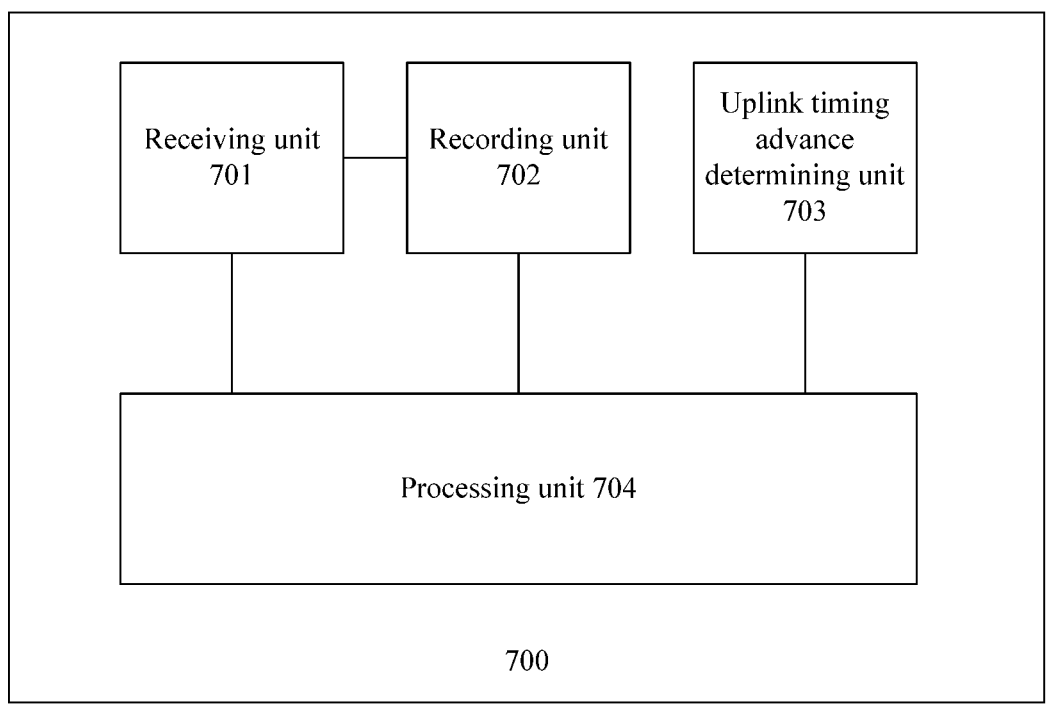
FIG. 7 is a schematic diagram of a logical structure of a terminal according to an embodiment of the present invention.

FIG. 7 is a diagram of a logical structure of an embodiment of a terminal according to the present invention. The terminal is configured to interact with a base station in the first embodiment, to determine a clock deviation between the terminal and the base station. Therefore, the descriptions and definitions in the related method executed on a terminal side in the first embodiment may be used for understanding execution modules in this embodiment of the present invention.

As shown in the figure, the terminal 700 includes a receiving unit 701, a recording unit 702, an uplink timing advance determining unit 703, and a processing unit 704. With reference to the first method embodiment:

the receiving unit 701 is configured to: receive a synchronization packet, and receive a sending time T1 of the synchronization packet;

the recording unit 702 is configured to determine a receiving time T2 of receiving the synchronization packet by the receiving unit;

the uplink timing advance determining unit 703 is configured to determine an uplink timing advance TA between the terminal and the base station; and the processing unit 704 is configured to: determine a one-way transmission delay Q1 based on the uplink timing advance TA determined by the uplink timing advance determining unit; and determine a time deviation between the terminal and the base station, where the time deviation is duration obtained after the one-way transmission delay Q1 is deducted from a time interval between T1 and T2.

Further, with reference to the first method embodiment, in some possible implementations, the receiving unit 701 is further configured to receive a random access response message sent by the base station.

Figure 8:
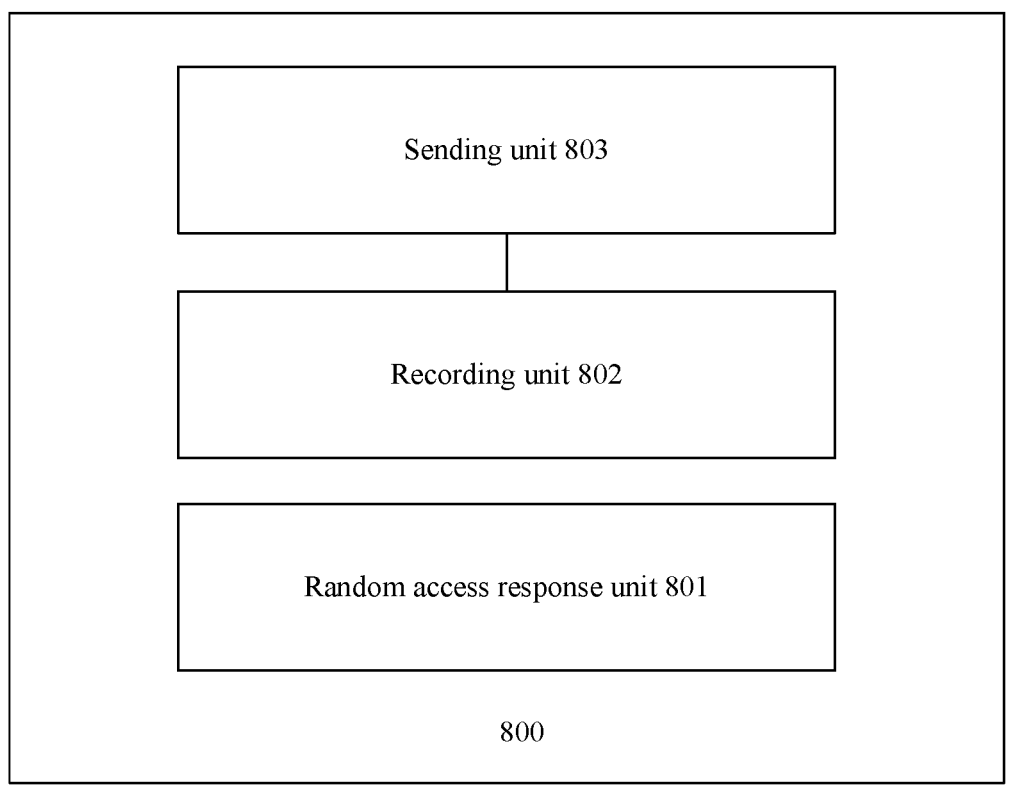
FIG. 8 is a schematic diagram of a logical structure of a base station according to an embodiment of the present invention.

FIG. 8 is a diagram of a logical structure of an embodiment of a base station according to the present invention. The base station is configured to interact with a terminal in the first embodiment, to determine a clock deviation between the terminal and the base station. Therefore, the descriptions and definitions in the related method executed on a base station side in the first embodiment may be used for understanding execution modules in this embodiment of the present invention.

As shown in the figure, the base station 800 includes a random access response unit 801, a recording unit 802, and a sending unit 803. With reference to the first embodiment:

the random access response unit 801 is configured to send a random access response message to the terminal;

the recording unit 802 is configured to determine a sending time of a synchronization packet sent by the base station; and the sending unit 803 is configured to: send the synchronization packet to the terminal, and send the sending time T1 of the synchronization packet to the terminal.

In some possible embodiments, the random access response unit 801 is further configured to determine a correction value of an uplink timing advance based on an uplink signal sent by the terminal, and the sending unit 803 is further configured to send the correction value of the uplink timing advance to the terminal by using the random access response message.

In the embodiments, the terminal 700 and the base station 800 interact with each other to implement the technical effects described in the method in the first embodiment. Therefore, details are not described herein again.

Figure 9:
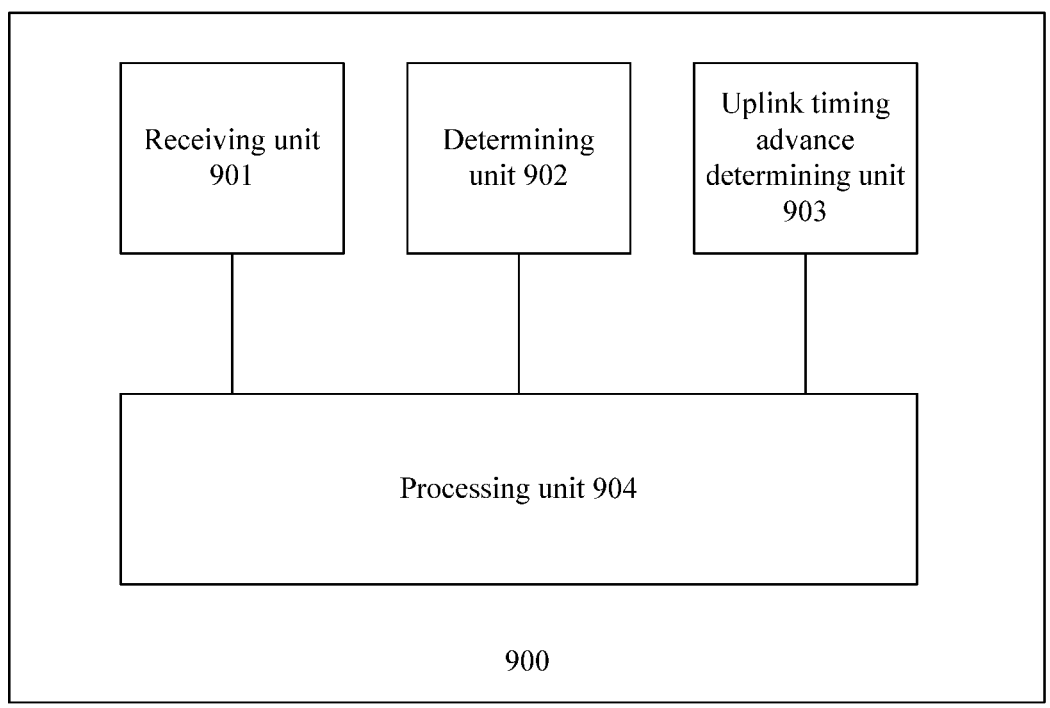
FIG. 9 is a schematic diagram of a logical structure of another terminal according to an embodiment of the present invention.

FIG. 9 is a diagram of a logical structure of an embodiment of a terminal according to the present invention. The terminal is configured to interact with a base station in the second embodiment, to determine a clock deviation between the terminal and the base station. Therefore, the descriptions and definitions in the related method executed a terminal side corresponding to FIG. 5A or FIG. 5B in the second embodiment, and specific or optional implementations of the related method may be used for understanding execution modules in this embodiment of the present invention.

As shown in the figure, the terminal 900 includes a receiving unit 901, a recording unit 902, an uplink timing advance determining unit 903, and a processing unit 904. With reference to the second method embodiment:

the receiving module 901 is configured to receive a first packet;

The record unit 902 is configured to determine a terminal clock time of any system frame;

the uplink timing advance determining unit 903 is configured to determine an uplink timing advance TA between the terminal and the base station; and referring to the method in FIG. 5A, the processing unit 904 is configured to: determine a one-way transmission delay Q1 based on the uplink timing advance TA determined by the uplink timing advance determining unit; obtain a receiving time T2 that is of a second system frame and is determined by the recording unit; determine a number of frames spaced between a first system frame and the second system frame; obtain an inter-frame time difference Q2 based on the number of spaced frames; and determine a time deviation between the terminal and the base station.

Alternatively, referring to the method in FIG. 5B, the processing unit 904 is configured to determine a one-way transmission delay Q1 based on the uplink timing advance TA determined by the uplink timing advance determining unit; obtain a receiving time T2 that is of a first system frame and is determined by the recording unit; and determine a time deviation between the terminal and the base station.

Further, with reference to the second method embodiment, in some possible implementations, the processing unit 904 is further configured to determine a system cycle period P2 to which the second system frame belongs.

In some embodiments, the receiving unit 901 is further configured to receive a random access response message sent by the base station, and the uplink timing advance determining unit 903 determines or updates the uplink timing advance based on the random access response message.

Figure 10:
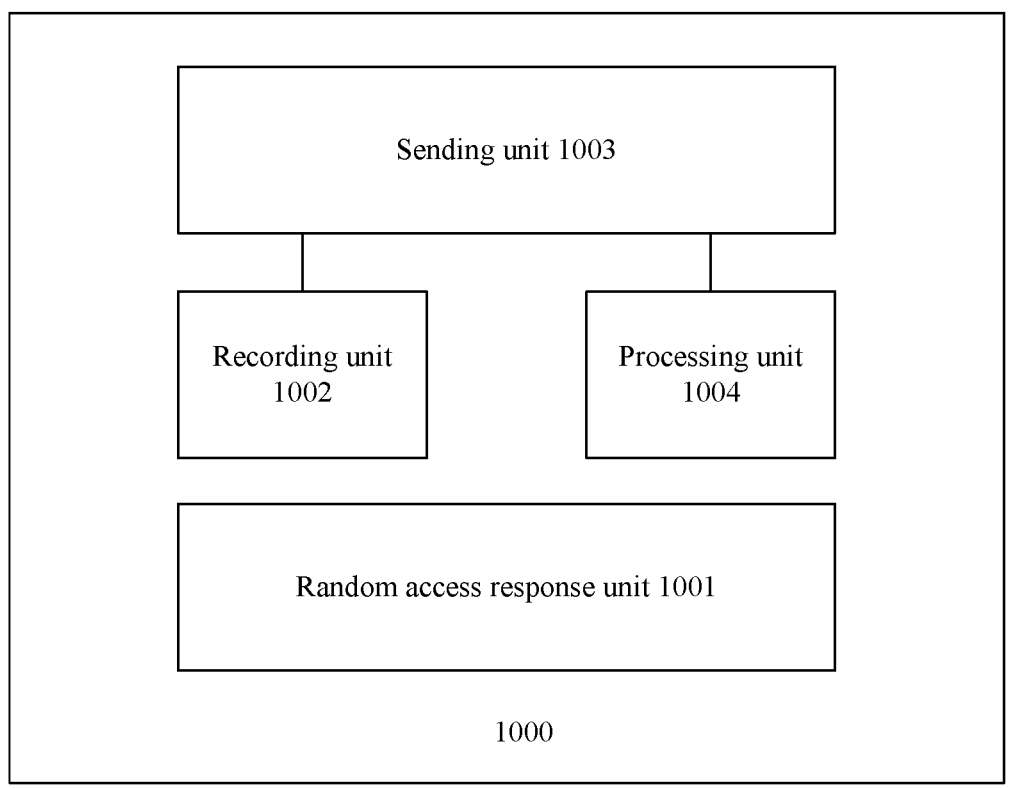
FIG. 10 is a schematic diagram of a logical structure of another base station according to an embodiment of the present invention.

FIG. 10 is a diagram of a logical structure of an embodiment of a base station according to the present invention. The base station is configured to interact with a base station in the second embodiment, to determine a clock deviation between a terminal and the base station. Therefore, the descriptions and definitions in the related method executed on a base station side in the second embodiment may be used for understanding execution modules in this embodiment of the present invention.

As shown in the figure, the base station 1000 includes a random access response unit 1001, a recording unit 1002, and a sending unit 1003. With reference to the second embodiment:

the random access response unit 1001 is configured to send a random access response message to the terminal;

the recording unit 1002 is configured to determine a base-station clock time of any system frame; and the sending unit 1003 is configured to send a first packet to the terminal, where the first packet includes the base-station clock time T1 that is of the first system frame and is determined by the recording unit.

In one embodiment, the base station 1000 further includes a processing unit 1004, configured to determine a system frame cycle period P1 to which the first system frame belongs.

In one embodiment, the random access response unit 1001 is further configured to determine a correction value of an uplink timing advance based on an uplink signal sent by the terminal, and the sending unit 1003 is further configured to send the correction value of the uplink timing advance to the terminal by using the random access response message.

In the embodiments, the terminal 900 and the base station 1000 interact with each other to implement the technical effects described in the method in the first embodiment. Therefore, details are not described herein again.

In the foregoing embodiments, unit division of the terminal 700, the terminal 900, the base station 800, and the base station 1000 is an example, and is merely logical function division. There may be another division manner in actual implementation. In addition, the function units in the embodiments of this application may be integrated into one processor, or each of the units may exist alone physically, or two or more units may be integrated into one unit. The integrated unit may be implemented in a form of hardware, or may be implemented in a form of a software function module.

Figure 11:
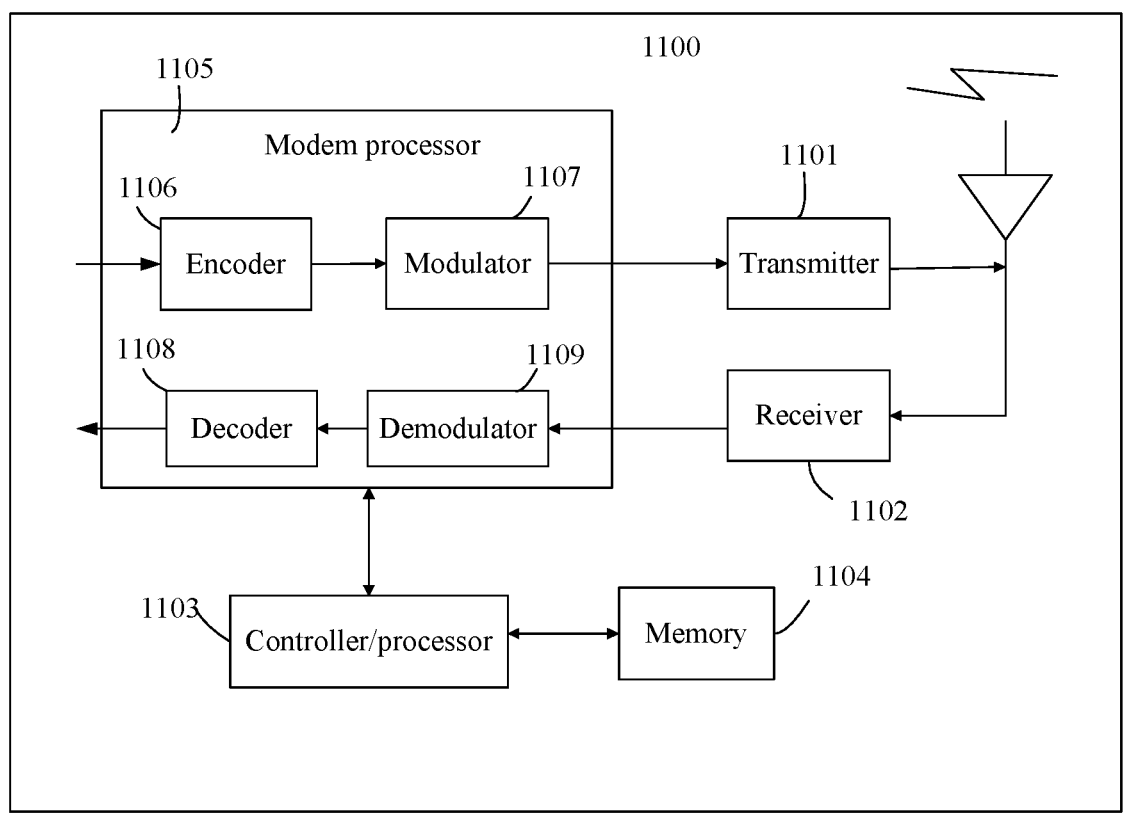
FIG. 11 is a schematic structural diagram of a terminal according to an embodiment of the present invention.

FIG. 11 is a hardware structure diagram of a terminal according to an embodiment of the present invention. The terminal 1100 may be a terminal-side execution body in the first method embodiment or the second method embodiment, and the terminal 1100 can implement functions of logical units in the terminal 700 or the terminal 800 in the foregoing embodiments. Therefore, this embodiment may be understood with reference to the descriptions in the first or the second method embodiment. Details are not described in this embodiment again.

The terminal includes a transmitter 1101, a receiver 1102, a controller/processor 1103, a memory 1104, and a modem processor 1105.

The transmitter 1101 adjusts (for example, performs analog conversion, filtering, amplification, and up-conversion on) an output sample, and generates an uplink signal. The uplink signal is transmitted to the base station in the embodiments by using an antenna. On a downlink, an antenna receives a downlink signal transmitted by the base station in the embodiment. The receiver 1102 adjusts (for example, performs filtering, amplification, down-conversion, and digitization on) the signal received from the antenna, and provides an input sample. In the modem processor 1105, an encoder 1106 receives service data and a signaling message that are to be sent on an uplink, and processes (for example, performs formatting, encoding, and interleaving on) the service data and the signaling message. A modulator 1107 further processes (for example, performs symbol mapping and modulation on) encoded service data and an encoded signaling message, and provides an output sample. A demodulator 1109 processes (for example, demodulates) the input sample, and provides a symbol estimation. A decoder 1108 processes (for example, performs de-interleaving and decoding on) the symbol estimation, and provides decoded data and a decoded signaling message that are sent to the terminal. The encoder 1106, the modulator 1107, the demodulator 1109, and the decoder 1108 may be implemented by the combined modem processor 1105. These units perform processing based on a radio access technology (for example, access technologies used in an LTE system and other evolved systems) used by a radio access network.

The controller/processor 1103 controls and manages an action of the terminal, and is configured to perform processing implemented by the terminal in the embodiments. For example, the controller/processor 1103 is configured to control the terminal to perform a clock deviation determining process in the embodiments of the present invention based on a set of received packet information. For example, the controller/processor 1103 may be configured to support the terminal in performing the method including S301, S304, and S305 in FIG. 3, the method including S501, S504, S505, S506, and S507 in FIG. 5A, and various possible implementations. The controller/processor may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. When S304 is performed to determine the terminal clock time T2 of receiving the synchronization packet and S504 is performed to determine the terminal clock time T2 of the second system frame, an independent or integrated dedicated chip or processor may be used to improve time recording precision.

The memory 1104 is configured to store program code and data that are used by the terminal 1100.

Figure 12:
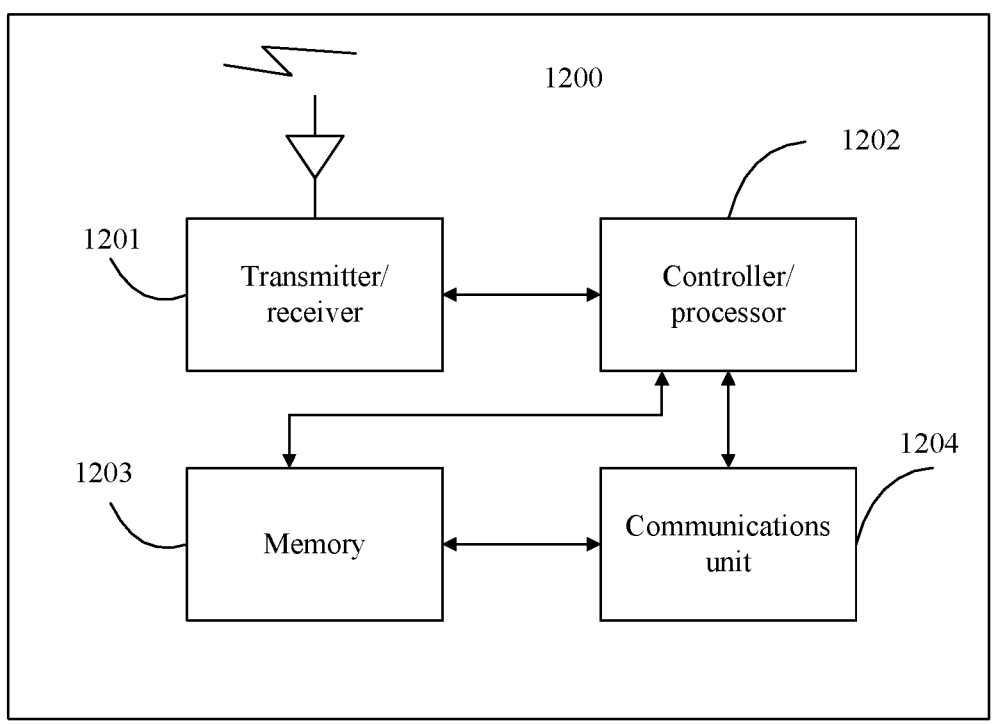
FIG. 12 is a schematic structural diagram of a base station according to an embodiment of the present invention.

FIG. 12 is a possible schematic structural diagram of a base station in the embodiments.

The base station 1200 includes a transmitter/receiver 1201, a controller/processor 1202, a memory 1203, and a communications unit 1204. The transmitter/receiver 1201 is configured to: support information sending and receiving between the base station and the terminal in the embodiments, and support radio communication between the terminal and another terminal. The controller/processor 1202 performs various functions for communicating with the terminal. On an uplink, an uplink signal from the terminal is received by an antenna, demodulated by the receiver 1201, and further processed by the controller/processor 1212 to restore service data and signaling information that are sent by the terminal. On a downlink, service data and a signaling message are processed by the controller/processor 1202, and modulated by the transmitter 1201 to generate a downlink signal, and the downlink signal is transmitted to the terminal by using an antenna. The controller/processor 1202 further performs processing procedures related to the base station in FIG. 3 to FIG. 5A and FIG. 5B, and/or other procedures in the technology described in this application. The controller/processor may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. When S303 is performed to determine the base-station clock time T1 of sending the synchronization packet and S502 is performed to determine the base-station clock time T1 of the first system frame, an independent or integrated dedicated chip or processor may be used to improve time recording precision. The memory 1203 is configured to store program code and data for the base station. The communications unit 1204 is configured to support the base station in communicating with another network entity.

It can be understood that FIG. 12 shows only a simplified design of the base station. In actual application, the base station may include any quantities of transmitters, receivers, processors, controllers, memories, communications units, and the like. All base stations that can implement the present invention fall within the protection scope of the present invention.

Method or algorithm operations described with reference to the content disclosed in the present invention may be implemented by using hardware, or may be implemented by a processor by executing a software instruction. The software instruction may be formed by a corresponding software module. The software module may be stored in a RAM memory, a flash memory, a ROM memory, an EPROM memory, an EEPROM memory, a register, a hard disk, a removable hard disk, a CD-ROM, or a storage medium of any other form known in the art. A storage medium used as an example is coupled to the processor, so that the processor can read information from the storage medium, and can write information into the storage medium. Certainly, the storage medium may be a constituent part of the processor. The processor and the storage medium may be located in an ASIC. In addition, the ASIC may be located in user equipment. Certainly, the processor and the storage medium may alternatively exist in user equipment as discrete components.

A person skilled in the art should be aware that in the one or more examples, the functions described in the present invention may be implemented by using hardware, software, firmware, or any combination thereof. When the functions are implemented by software, these functions may be stored in a computer-readable medium or transmitted as one or more instructions or code in the computer-readable medium. The computer-readable medium includes a computer storage medium and a communications medium, where the communications medium includes any medium that facilitates transmission of a computer program from one place to another. The storage medium may be any available medium that can be accessed by a general-purpose or special-purpose computer.

In the foregoing specific implementations, the objectives, technical solutions, and beneficial effects of the present invention are further described in detail. It should be understood that the foregoing descriptions are merely specific implementations of the present invention, but are not intended to limit the protection scope of the present invention. Any modification, equivalent replacement, or improvement made based on the technical solutions of the present invention should fall within the protection scope of the present invention.

What is claimed is:

1. A time deviation determining method to determine a clock time deviation between a terminal and a base station in a wireless network, the method comprising:
    obtaining a one-way transmission delay Q1 based on an uplink timing advance TA between the terminal and the base station and a sampling time of a network in which the terminal is located;
    receiving a first packet having a base-station clock time T1 of a first system frame, wherein the first system frame is any system frame existing after downlink synchronization between the base station and the terminal is completed;
    determining a terminal clock time T2 of a second system frame, wherein the second system frame is any system frame following the first system frame;
    obtaining an inter-frame time difference Q2 based on a number of frames spaced between the first system frame and the second system frame, wherein the inter-frame time difference Q2 is a product of the number of spaced frames and duration of one system frame; and
    determining the clock time deviation between the terminal and the base station, wherein the clock time deviation is duration obtained after the one-way transmission delay Q1 and the inter-frame time difference Q2 are deducted from a time interval between T1 and T2.

2. The method according to claim 1, wherein the first packet further comprises a first system frame cycle period P1 to which the first system frame belongs;
    the method further comprises: determining a second system frame cycle period P2 to which the second system frame belongs; and
    wherein the determining a number of frames spaced between the first system frame and the second system frame comprises:
    determining, based on the first and second system frame cycle periods P1 and P2, a number of cycle periods spaced between the first system frame and the second system frame; and
    determining the number of spaced frames based on a frame number of the first system frame, a frame number of the second system frame, and the number of spaced cycle periods.

3. The method according to claim 2, further comprising:
    recording a terminal clock time T0 of a third system frame, wherein the third system frame is any system frame that is before the first system frame and that is in a first cycle period existing after the terminal completes downlink synchronization; and
    wherein the determining a second system frame cycle period P2 to which the second system frame belongs comprises:
    determining, based on duration of one system cycle period and a time difference between T2 and T0, the second system frame cycle period P2 to which the second system frame belongs.

4. The method according to claim 2, wherein the first packet further comprises the frame number of the first system frame.

5. The method according to claim 1, wherein the determining a terminal clock time T2 of a second system frame comprises:
    recording, at a physical layer based on a frame number of the second system frame, a terminal clock time corresponding to the second system frame, to determine the terminal clock time T2 of the second system frame.

6. A time deviation determining method, to determine a clock time deviation between a terminal and a base station in a wireless network, the method comprising:
    determining an uplink timing advance TA between the terminal and the base station, and determining a one-way transmission delay Q1 based on the uplink timing advance TA and a sampling time of a network in which the terminal is located;
    receiving a first packet having a base-station clock time T1 of a first system frame, wherein the first system frame is any system frame existing after downlink synchronization between the base station and the terminal is completed;
determining a terminal clock time T2 of the first system frame; and
determining the clock time deviation between the terminal and the base station, wherein the clock time deviation is duration obtained after the one-way transmission delay Q1 is deducted from a time interval between T1 and T2.

7. The method according to claim 6, wherein the first packet further comprises a frame number of the first system frame.

8. The method according to claim 6, wherein the determining a terminal clock time T2 of the first system frame comprises:
recording, at a physical layer based on the frame number of the first system frame, a terminal clock time corresponding to the first system frame to determine the terminal clock time T2 of the first system frame.

9. A terminal, comprising:
a receiving unit configured to receive a first packet having a base-station clock time T1 of a first system frame, wherein the first system frame is any system frame existing after downlink synchronization between a base station and the terminal is completed;
a recording unit configured to determine a terminal clock time T2 of a second system frame;
an uplink timing advance determining unit configured to determine an uplink timing advance TA between the terminal and the base station; and
a processing unit configured to:
determine a one-way transmission delay Q1 based on the uplink timing advance TA and a sampling time of a network in which the terminal is located;
obtain the terminal clock time T2 of the second system frame determined by the recoding unit, wherein the second system frame is any system frame received after the first system frame is received;
determine a number of frames spaced between the first system frame and the second system frame;
obtain an inter-frame time difference Q2 based on the number of spaced frames, wherein the inter-frame time difference Q2 is a product of the number of spaced frames and duration of one system frame; and
determine a time deviation between the terminal and the base station, wherein the time deviation is duration obtained after the one-way transmission delay Q1 and the inter-frame time difference Q2 are deducted from a time interval between T1 and T2.

10. The terminal according to claim 9, wherein the first packet further comprises a first system frame cycle period P1 to which the first system frame belongs;
the processing unit is further configured to determine a second system frame cycle period P2 to which the second system frame belongs; and
when determining the number of frames spaced between the first system frame and the second system frame, the processing unit is configured to:
determine, based on the first and second system frame cycle periods P1 and P2, a number of cycle periods spaced between the first system frame and the second system frame; and
determine the number of spaced frames based on a frame number of the first system frame, a frame number of the second system frame, and the number of spaced cycle periods.

11. The terminal according to claim 10, wherein determining a second system frame cycle period P2 to which the second system frame belongs comprises:
obtaining a terminal clock time T0 that is of a third system frame recorded by the recording unit, wherein the third system frame is any system frame that is before the first system frame and that is in the first cycle period existing after the terminal completes downlink synchronization; and
determining, based on duration of one system cycle period and a time difference between T2 and T0, the second system frame cycle period P2 to which the second system frame belongs.

12. The terminal according to claim 9, wherein the first packet further comprises the frame number of the first system frame.

13. The terminal according to claim 9, wherein when determining the terminal clock time of the any system frame, the recording unit is configured to record, at a physical layer based on a frame number of the any system frame, a terminal clock time corresponding to the second system frame to determine the terminal clock time of the any system frame.

14. A terminal, comprising:
a receiving unit configured to receive a first packet, having a base-station clock time T1 of a first system frame, wherein the first system frame is any system frame existing after downlink synchronization between a base station and the terminal is completed;
a recording unit configured to determine a terminal clock time;
an uplink timing advance determining unit; configured to determine an uplink timing advance TA between the terminal and the base station; and
a processing unit configured to:
determine a one-way transmission delay Q1 based on the uplink timing advance TA and a sampling time of a network in which the terminal is located;
obtain a terminal clock time T2 of the first system frame determined by the recoding unit; and
determine a time deviation between the terminal and the base station, wherein the time deviation is duration obtained after the one-way transmission delay Q1 is deducted from a time interval between T1 and T2.

15. The terminal according to claim 14, wherein the first packet further comprises a frame number of the first system frame.

16. The terminal according to claim 14, wherein when determining the terminal clock time T2 of the first system frame, the processing unit is configured to record, at a physical layer based on the frame number of the first system frame, a terminal clock time corresponding to the first system frame to determine the terminal clock time T2 of the first system frame.

17. A base station, comprising:
a random access response unit configured to send a random access response message to a terminal, wherein the random access response message comprises an uplink timing advance, so that the terminal determines a one-way transmission delay Q1 based on the uplink timing advance;
a recording unit, configured to determine a base-station clock time T1 of a first system frame; and
a sending unit configured to send a first packet to the terminal, wherein the first packet comprises the base-station clock time T1 of the first system frame determined by the recording unit, and wherein first system frame is any system frame existing after downlink synchronization between the base station and the terminal is completed, so that the terminal determines a clock deviation between the terminal and the base station based on Q1, T1, a terminal clock time T2 of a second system frame, and an inter-frame time difference Q2, wherein the second system frame is any system frame following the first system frame, and the inter-frame time difference Q2 is a product of duration of one system frame and a number of frames spaced between the first system frame and the second system frame.

18. The base station according to claim 17, further comprising:

a processing unit configured to determine a system frame cycle period P1 to which the first system frame belongs; and the first packet further comprises the system frame cycle period P1 to which the first system frame belongs.

19. The base station according to claim 18, wherein when determining the system frame cycle period P1, the processing unit is configured to:

determine a base-station clock time T0 of a third system frame determined by the recording unit, wherein the third system frame is any system frame that is before the first system frame and that is in the first cycle period existing after the terminal completes the downlink synchronization; and determine, based on duration of one system cycle period and a time difference between T1 and T0, the system cycle period P1 to which the first system frame belongs.

20. The base station according to claim 17, wherein when sending the first packet to the terminal, the sending unit is configured to send the first packet through broadcasting.

* * * * *